United States Patent
Otsuka et al.

(10) Patent No.: US 9,966,606 B2
(45) Date of Patent: May 8, 2018

(54) BINDER COMPOSITION FOR POWER STORAGE DEVICES

(71) Applicant: JSR CORPORATION, Minato-ku (JP)

(72) Inventors: Yoshiharu Otsuka, Minato-ku (JP); Nobuyuki Fujihara, Minato-ku (JP); Hiroyuki Miyauchi, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 263 days.

(21) Appl. No.: 14/779,840

(22) PCT Filed: Mar. 25, 2014

(86) PCT No.: PCT/JP2014/059388
§ 371 (c)(1),
(2) Date: Sep. 24, 2015

(87) PCT Pub. No.: WO2014/157715
PCT Pub. Date: Oct. 2, 2014

(65) Prior Publication Data
US 2016/0079007 A1 Mar. 17, 2016

(30) Foreign Application Priority Data
Mar. 27, 2013 (JP) .................................. 2013-066216

(51) Int. Cl.
*H01M 4/62* (2006.01)
*H01M 2/16* (2006.01)
(Continued)

(52) U.S. Cl.
CPC .............. *H01M 4/622* (2013.01); *C08F 2/001* (2013.01); *C08F 220/04* (2013.01);
(Continued)

(58) Field of Classification Search
CPC . H01M 2/1653; H01M 4/622; H01M 10/0565
(Continued)

(56) References Cited

U.S. PATENT DOCUMENTS

2006/0251966 A1  11/2006 Yamakawa et al.
2007/0274023 A1  11/2007 Mori et al.
(Continued)

FOREIGN PATENT DOCUMENTS

CN  102034966 A  4/2011
CN  102694175 A  9/2012
(Continued)

OTHER PUBLICATIONS

Office Action dated Oct. 28, 2016 in Chinese Patent Application No. 201480018491.0.
Office Action dated Apr. 27, 2017 in Chinese Patent Application No. 201480018491.0.
International Search Report dated Jun. 10, 2014 for PCT/JP2014/059388 filed on Mar. 25, 2014.
International Preliminary Report of Patentability and Written Opinion dated Oct. 8, 2015 in PCT/JP2014/059388 (English translation only).

*Primary Examiner* — Basia Ridley
*Assistant Examiner* — James Erwin
(74) *Attorney, Agent, or Firm* — Oblon, McClelland, Maier & Neustadt, L.L.P.

(57) ABSTRACT

A binder composition for power storage devices comprising a polymer which contains at least 3 to 40 mass % of a first recurring unit derived from an unsaturated carboxylic acid ester having an alicyclic hydrocarbon group and 1 to 40 mass % of a second recurring unit derived from an α,β-unsaturated nitrile compound based on 100 mass % of the total of all recurring units.

12 Claims, 2 Drawing Sheets

(51) Int. Cl.
  *H01M 10/0565* (2010.01)
  *C08F 220/04* (2006.01)
  *C08F 220/12* (2006.01)
  *C08F 220/42* (2006.01)
  *C08J 5/18* (2006.01)
  *C08F 2/00* (2006.01)
  *C08F 220/18* (2006.01)
  *H01G 11/52* (2013.01)
  *H01G 11/38* (2013.01)
  *C08F 222/30* (2006.01)
  *H01B 1/20* (2006.01)
  *H01M 10/0525* (2010.01)

(52) U.S. Cl.
  CPC .......... *C08F 220/12* (2013.01); *C08F 220/18* (2013.01); *C08F 220/42* (2013.01); *C08J 5/18* (2013.01); *H01M 2/1653* (2013.01); *H01M 2/1673* (2013.01); *H01M 10/0565* (2013.01); *C08F 222/30* (2013.01); *H01B 1/20* (2013.01); *H01G 11/38* (2013.01); *H01G 11/52* (2013.01); *H01M 10/0525* (2013.01); *Y02E 60/13* (2013.01); *Y02T 10/7022* (2013.01)

(58) Field of Classification Search
  USPC .......................................................... 429/246
  See application file for complete search history.

(56) References Cited

U.S. PATENT DOCUMENTS

| | | | |
|---|---|---|---|
| 2010/0255380 A1 | 10/2010 | Baba et al. | |
| 2012/0095131 A1* | 4/2012 | Kinoshita | H01M 4/621 523/410 |
| 2012/0309892 A1 | 12/2012 | Ootsuka et al. | |

FOREIGN PATENT DOCUMENTS

| | | | | |
|---|---|---|---|---|
| CN | 102763252 A | | 10/2012 | |
| JP | 8-287915 A | | 11/1996 | |
| JP | 2004-185810 A | | 7/2004 | |
| JP | 2006-48932 A | | 2/2006 | |
| JP | 2009-54455 A | | 3/2009 | |
| JP | 2009-87562 A | | 4/2009 | |
| JP | 2012-104406 A | | 5/2012 | |
| KR | 2011005657 A | * | 6/2011 | ............ H01M 10/04 |
| WO | 2004/084245 A1 | | 9/2004 | |
| WO | 2005/041225 A1 | | 5/2005 | |
| WO | WO 2009/041395 A1 | | 4/2009 | |
| WO | 2011/068215 A1 | | 6/2011 | |
| WO | 2012/169094 A1 | | 12/2012 | |
| WO | 2014/041983 A1 | | 3/2014 | |

* cited by examiner

BINDER COMPOSITION FOR POWER STORAGE DEVICES

CROSS-REFERENCE TO RELATED APPLICATIONS

This application is a National Stage of PCT/JP2014/059388, which was filed on Mar 25, 2014. This application is based upon and claims the benefit of priority to Japanese Application No. 2013-066216, which was filed on Mar 27, 2013.

TECHNICAL FIELD

The present invention relates to a binder composition for power storage devices.

BACKGROUND ART

In recent years, as a drive power source for electronic equipment, a power storage device having high voltage and high energy density has been desired. Lithium ion batteries, lithium ion secondary batteries and lithium ion capacitors have been expected as power storage devices for this use.

Electrodes used in such power storage devices are generally manufactured by coating a mixture of an electrode active material and polymer particles which serve as a binder on the surface of a collector and drying it. Characteristic properties required for the polymer particles include bonding ability between electrode active materials, adhesion ability between an electrode active material and a collector, abrasion resistance in the step of taking up an electrode, and powder fall-off resistance that fine powders of the electrode active material are not produced from an electrode composition coating layer (to be referred to as "electrode active material layer" or simply as "active material layer" hereinafter) by the subsequent cutting step. When the polymer particles satisfy these requirements, the degree of freedom for the method of folding the obtained electrode and for designing the structure of a power storage device such as the setting of the winding radius becomes high, thereby making possible the downsizing of the device. It is empirically found that, as for bonding ability between the electrode active materials, adhesion ability between the electrode active material layer and the collector, and powder fall-off resistance, their performances are almost in proportion to one another. Therefore, in this text, they may be comprehensively expressed by using the term "adhesion" hereinafter.

The required performance of the binder material is becoming higher and higher. When the material is used in a positive electrode, it must have high resistance to oxidation and when it is used in a negative electrode, it must have high resistance to reduction. In addition, the binder material must have a fine balance between the property of facilitating the movement of an electrolyte by swelling appropriately through contact with an electrolytic solution and the property of preventing the above swelling from causing the increase of electrode resistance and the reduction of adhesion. Further, in recent years, a power storage device capable of high-speed discharge which can ensure rapid acceleration when it is mounted as a drive power source for electric cars has been desired.

Under the above situation, in the prior art, various proposals were made to adjust the affinity for an electrolytic solution of a binder material so as to improve adhesion, charge/discharge characteristics and durability. For example, technology for introducing a cyclohexyl group into a polymer which is a binder material (JP-A 2012-104406 (Patent Document 1)) and technology for introducing a nitrile group (JP-A08-287915 (Patent Document 2) and JP-A2006-48932 (Patent Document 3)) are proposed.

Even with the above prior art, high-speed charge/discharge characteristics which enable a drive power source to be mounted on an electric car are not attained. That is, the technology of Patent Document 1 is based on an idea of enhancing the time durability of a power storage device by improving the electrolytic solution resistance of the binder material. However, according to this technology, since the affinity for an electrolytic solution of the binder component is impaired, the required level of high-speed discharge characteristics is not attained. Meanwhile, the technology of Patent Documents 2 and 3 is aimed to attain high-speed discharge characteristics by improving the affinity for an electrolytic solution of the binder material. However, since this material has excessively high swellability when it comes into contact with an electrolytic solution, its deterioration during use or storage of the power storage device at a high temperature is large. Therefore, it has a problem with durability.

Thus, in the prior art, it is considered that there is a trade-off relationship between the durability of a power storage device and charge/discharge characteristics (especially high-speed discharge characteristics).

To realize the miniaturization of a power storage device, a separator film for separating a positive electrode from a negative electrode must be reduced in thickness. Since the distance between the positive electrode and the negative electrode becomes short by making the separator thin, the height of the power storage device can be reduced. However, when the distance between the positive electrode and the negative electrode becomes short, the potential of the occurrence of a short circuit becomes high. Especially in a power storage device making use of a metal ion conductor (for example, a lithium ion), dendrite is produced on the surface of an electrode by repetitions of charging and discharging with the result that a short circuit occurs more easily. Dendrite is a metal precipitate formed from a metal ion and generally grows into a needle form. Therefore, dendrite may grow through the separator which is a porous film and may cause a short circuit in a power storage device when it reaches the surface of an opposite electrode.

For the above reason, when the distance between the positive electrode and the negative electrode becomes short by the reduction of the thickness of the separator film, the risk of a short circuit caused by dendrite becomes high. To eliminate this phenomenon, an attempt is being made to form a porous film on the surface of the separator so as to enhance the penetration resistance of the separator. As the material forming the above porous film, a material comprising inorganic fine particles and a resin binder selected from polyimide resin, polyamide resin and polyamide-imide resin is proposed by WO2009/041395 (Patent Document 4) and JP-A 2009-87562 (Patent Document 5), and a material comprising metal oxide fine particles and a binder containing a fluorine-based resin and rubber-based resin is proposed by JP-A 2009-54455 (Patent Document 6).

In the technologies of Patent Documents 4 to 6, a certain effect of preventing a short circuit caused by dendrite in a power storage device making use of a metal ion conductor is recognized. However, since these protective films are unsatisfactory in terms of the permeability and retainability of an electrolytic solution, the internal resistance of a power storage device rises, thereby impairing charge/discharge characteristics.

DISCLOSURE OF THE INVENTION

The present invention was made to break through the above situation.

It is therefore an object of the present invention to provide a binder material which has excellent resistance to oxidation and reduction and provides a power storage device having durability and charge/discharge characteristics (especially high-speed discharge characteristics).

The above object and advantage of the present invention are attained by a binder composition for power storage devices, comprising a polymer which comprises at least 3 to 40 mass % of a first recurring unit derived from an unsaturated carboxylic acid ester having an alicyclic hydrocarbon group and 1 to 40 mass % of a second recurring unit derived from an $\alpha$, $\beta$-unsaturated nitrile compound based on 100 mass % of the total of all recurring units.

The above binder composition for power storage devices can be advantageously used as slurry for the electrode of a power storage device by blending an electrode active material and as slurry for the protective film of a power storage device by blending a filler.

BEST MODE FOR CARRYING OUT THE INVENTION

Figure 1:
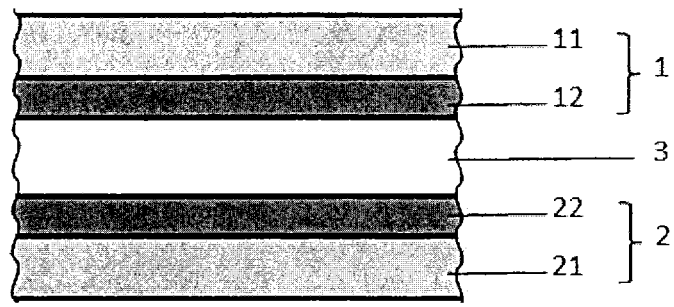
FIG. 1 is a schematic sectional view showing the basic structure of a power storage device.

A preferred embodiment of the present invention is described in detail hereinbelow. It is to be understood that the present invention is not limited only to the embodiment described below and that various changes and modifications may be made in the invention without departing from the spirit and scope thereof.

The term "(meth) acrylic acid~" in this text means a concept including both "acrylic acid~" and "methacrylic acid~". The term "~(meth) acrylate" means a concept including both "~acrylate" and "~methacrylate".

1. Binder Composition for Power Storage Devices

The binder composition for power storage devices of this embodiment is a composition comprising a polymer.

The binder composition for power storage devices of this embodiment is advantageously used as slurry for the electrode of a power storage device by blending an electrode active material; and as slurry for the protective film of a power storage device by blending a filler.

1.1 Polymer

The polymer contained in the binder composition for power storage devices of the present invention contains a polymer having at least a first recurring unit derived from an unsaturated carboxylic acid ester having an alicyclic hydrocarbon group (to be referred to as "compound (a1)" hereinafter) and a second recurring unit derived from an $\alpha$, $\beta$-unsaturated nitrile compound (to be referred to as "compound (a2)" hereinafter).

It is considered that when a binder component in an active material layer or a protective film is swollen with an electrolytic solution, the diffusibility of a lithium ion is improved with a result that the internal resistance of a power storage device is expected to be reduced. However, when the binder component is excessively swollen, its adhesion ability degrades and therefore the active material or the filler falls off by charging or discharging, whereby charge/discharge characteristics deteriorate. Thus, it is difficult to balance between swellability with the electrolytic solution and adhesion in the prior art, and it is considered that they have a trade-off relationship. However, in the present invention, by adjusting the content of the first constituent unit derived from the compound (a1) and the content of the second constituent unit derived from the compound (a2) to the above ranges, the inventors of the present invention succeeded in balancing between swellability with the electrolytic solution and adhesion and also obtaining excellent charge/discharge characteristics (especially high-speed discharge characteristics) and durability at the same time.

The above polymer may have at least one recurring unit selected from the group consisting of a recurring unit derived from an unsaturated carboxylic acid (to be referred to as "compound (a3)" hereinafter), a recurring unit derived from a monomer having a fluorine atom (to be referred to as "compound (a4)" hereinafter), a recurring unit derived from an unsaturated carboxylic acid ester (excluding the above compounds (a1) and (a4). The same shall apply hereinbelow. To be referred to as "compound (a5)" hereinafter), a recurring unit derived from at least one (to be referred to as "compound (a6)" hereinafter) selected from a conjugated diene compound and an aromatic vinyl compound, a recurring unit derived from a crosslinkable monomer (to be referred to as "compound (a7)" hereinafter) and a recurring unit derived from an $\alpha$-olefin (to be referred to as "compound (a8)" hereinafter) in addition to the above recurring units.

Preferably, the polymer contained in the binder composition for power storage devices of the present invention does not have a recurring unit derived from a monomer except for the compounds (a1) to (a8).

1.1.1 Recurring Units of Polymer
1.1.1.1 Recurring Unit Derived from Compound (a1)

The compound (a1) is an unsaturated carboxylic acid ester having an alicyclic hydrocarbon group. The compound (a1) is preferably at least one selected from the group consisting of a monocyclic cycloalkyl ester, bicyclic cycloalkyl ester, cyclic hydrocarbon ester having 3 or more rings and spirocyclic cycloalkyl ester of an unsaturated carboxylic acid. The content of the recurring unit derived from the compound (a1) in the polymer contained in the binder composition for power storage devices of the present invention is 3 to 40 mass % based on 100 mass % of the total of all the recurring units. This value is preferably 3 to 30 mass %, more preferably 3 to 25 mass %. The polymer having the recurring unit derived from the compound (a1) within the above range can control dissolution by an electrolyte when it serves as a binder in an active material layer or a protective film. Therefore, its performance deterioration during use or storage at a high temperature can be minimized advantageously.

The monocyclic cycloalkyl ester of an unsaturated carboxylic acid is preferably an ester compound having a monocyclic cyloalkyl group with 5 to 12 carbon atoms. Examples thereof include cyclopentyl (meth)acrylate, cyclohexyl (meth)acrylate, cycloheptyl (meth)acrylate, 4-methylcyclohexyl (meth)acrylate, 3,3,5-trimethylcyclohexyl (meth)acrylate, cyclooctyl (meth)acrylate, cyclodecyl (meth)acrylate and menthyl (meth)acrylate. The bicyclic cycloalkyl ester of an unsaturated carboxylic acid is preferably an ester compound having a bicyclic cycloalkyl group with 6 to 20 carbon atoms. Examples thereof include norbornyl (meth)acrylate, decahydronaphthyl (meth)acrylate, bicycloundecyl (meth)acrylate and isobornyl (meth)acrylate.

Preferred examples of the cyclic hydrocarbon ester having 3 or more rings of an unsaturated carboxylic acid include tricyclo[5.2.1.0$^{2.6}$]decyl(meth)acrylate, tricyclo[5.2.1.0$^{2.6}$]deca-3-yl(meth)acrylate, 2-adamantyl (meth)acrylate, 2-(2-methyladamantyl)(meth)acrylate, 2-(2-ethyladamantyl) (meth)acrylate; and unsaturated carboxylic acid esters having a steroid skeleton. As the unsaturated carboxylic acid esters having a steroid skeleton, unsaturated carboxylic acid esters having an unsaturated steroid skeleton may be used, as exemplified by 3-cholestanyl (meth)acrylate, 3-cholesteryl (meth)acrylate, 3-lanostanyl (meth)acrylate and 3-estranyl (meth)acrylate.

As the spirocyclic cycloalkyl ester of an unsaturated carboxylic acid, spiro[5.5]undecyl(meth)acrylate may be used.

When the compound (a1) in the present invention is represented by RCOOR', a compound obtained by interrupting a group corresponding to the group R' by at least one ether bond or a compound obtained by substituting at least one of hydrogen atoms of a group corresponding to the group R' by a hydroxyl group may be used. Examples of the above compounds include 1,4-cyclohexanedimethanol mono(meth)acrylate, dicyclopentenyloxyethyl(meth)acrylate, 1-(3-hydroxyadamantyl)(meth)acrylate, 1-(5-hydroxyadamantyl)(meth)acrylate and 1-(3,5-dihydroxyadamantyl) (meth)acrylate.

In the polymer contained in the binder composition for power storage devices of the present invention, the constituent units derived from the compound (a1) may exist alone or in combination of two or more.

1.1.1.2 Recurring Unit Derived from Compound (a2)

The compound (a2) is an α, β-unsaturated nitrile compound.

The content of the recurring unit derived from the compound (a2) in the polymer contained in the binder composition for power storage devices of the present invention is 1 to 40 mass % based on 100 mass % of the total of all the recurring units. This value is preferably 2 to 25 mass %, more preferably 3 to 15 mass %. The polymer having the recurring unit derived from the compound (a2) within the above range exhibits suitable swellability when it comes into contact with an electrolytic solution with a result that it can retain adhesion for a long time advantageously.

Examples of the compound (a2) include (meth) acrylonitrile, α-chloroacrylonitrile, α-ethyl acrylonitrile and vinylidene cyanide. Out of these, (meth)acrylonitrile is preferred, and acrylonitrile is particularly preferred.

In the polymer contained in the binder composition for power storage devices of the present invention, the recurring units derived from the compound (a2) may exist alone or in combination of two or more.

1.1.1.3 Recurring Unit Derived from Compound (a3)

The compound (a3) is an unsaturated carboxylic acid. The polymer contained in the binder composition for power storage devices of the present invention may have and preferably has a recurring unit derived from the compound (a3).

The content of the recurring unit derived from the compound (a3) in the polymer contained in the binder composition for power storage devices of the present invention is preferably not more than 15 mass %, more preferably 1 to 12 mass %, much more preferably 3 to 10 mass % based on 100 mass % of the total of all the recurring units.

The polymer having the recurring unit derived from the compound (a3) is excellent in the dispersibility of an active material and a filler. Therefore, slurry having excellent homogeneity and stability can be prepared advantageously without the agglomeration of an active material (and a conductivity imparting agent when existent) at the time of preparing electrode slurry and without the agglomeration of a filler at the time of preparing protective film slurry. Therefore, since adhesion defects in the electrode and the protective film produced by using the slurry for power storage devices can be reduced as much as possible, the slurry becomes excellent in adhesion and homogeneity.

As the compound (a3), an unsaturated monocarboxylic acid and an unsaturated dicarboxylic acid may be used, and examples thereof include unsaturated monocarboxylic acids such as (meth) acrylic acid and crotonic acid, and unsaturated dicarboxylic acids such as maleic acid, fumaric acid and itaconic acid. Anhydrides of these unsaturated dicarboxylic acids may also be used. The compound (a3) is particularly preferably at least one selected from (meth) acrylic acid and itaconic acid.

In the polymer contained in the binder composition for power storage devices of the present invention, the recurring units derived from the compound (a3) may exist alone or in combination of two or more.

1.1.1.4 Recurring Unit Derived from Compound (a4)

The compound (a4) is a monomer having a fluorine atom.

The polymer contained in the binder composition for power storage devices of the present invention may have a recurring unit derived from the compound (a4). The content of the recurring unit derived from the compound (a4) in the polymer contained in the binder composition for power storage devices of the present invention is not more than 50 mass %, more preferably 5 to 40 mass %, much more preferably 15 to 30 mass % based on 100 mass % of the total of all the recurring units. However, when the polymer contained in the binder composition for power storage devices of the present invention has a recurring unit derived from the compound (a6) which will be described hereinafter, preferably, it does not have the recurring unit derived from the compound (a4).

Since the polymer having the recurring unit derived from the compound (a4) has excellent oxidation resistance, a power storage device having a positive electrode or a protective film produced by using the binder composition for power storage devices comprising the polymer is expected to have improved overcharge resistance advantageously.

The compound (a4) is selected from an olefin compound having a fluorine atom and a (meth)acrylic acid ester having a fluorine atom. Examples of the olefin compound having a fluorine atom include vinylidene fluoride, ethylene tetrafluoride, propylene hexafluoride, trifluorochloroethylene and perfluoroalkyl vinyl ether. Examples of the (meth)acrylic acid ester having a fluorine atom include compounds represented by the following general formula (1) and 3[4[1-trifluoromethyl-2,2-bis[bis(trifluoromethyl)fluoro methyl]ethynyloxy]benzoxy]2-hydroxypropyl(meth)acrylate.

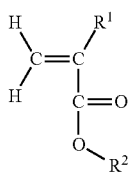
(1)

(In the above general formula (1), $R^1$ is a hydrogen atom or methyl group, and $R^2$ is a hydrocarbon group containing a fluorine atom and having 1 to 18 carbon atoms.)

$R^2$ in the above general formula (1) is a fluorinated alkyl group having 1 to 12 carbon atoms, fluorinated aryl group having 6 to 16 carbon atoms or fluorinated aralkyl group having 7 to 18 carbon atoms, out of which a fluorinated alkyl group having 1 to 12 carbon atoms is preferred. Preferred examples of $R^2$ in the above general formula (1) include 2,2,2-trifluoroethyl group, 2,2,3,3,3-pentafluoropropyl group, 1,1,1,3,3,3-hexafluoropropan-2-group, β-(perfluorooctyl)ethyl group, 2,2,3,3-tetrafluoropropyl group, 2,2,3,4,4,4-hexafluorobutyl group, 1H,1H,5H-octafluoropentyl group, 1H,1H-9H-perfluoro-1-nonyl group, 1H,1H,1H-perfluoroundecyl group and perfluorooctyl group. As the monomer having a fluorine atom, olefin compounds having a fluorine atom are preferred, and at least one selected from the group consisting of vinylidene fluoride, ethylene tetrafluoride and propylene hexafluoride is particularly preferred.

In the polymer contained in the binder composition for power storage devices of the present invention, the constituent units derived from the compound (a4) may exist alone or in combination of two or more.

1.1.1.5 Recurring Unit Derived from Compound (a5)

The compound (a5) is an unsaturated carboxylic acid ester. The above compounds (a1) and (a4) are excluded. The polymer contained in the binder composition for power storage devices of the present invention may have a recurring unit derived from the compound (a5).

The content of the recurring unit derived from the compound (a5) in the polymer contained in the binder composition for power storage devices of the present invention is preferably not more than 95 mass %, more preferably 30 to 90 mass %, much more preferably 40 to 85 mass % based on 100 mass % of the total of all the recurring units.

Since the glass transition temperature Tg of the obtained polymer having the recurring unit derived from the compound (a5) can be arbitrarily adjusted by suitably selecting the type and content of the compound (a5), the binder composition for power storage devices comprising the polymer can provide an electrode and a protective film exhibiting high adhesion advantageously.

Examples of the compound (a5) include alkyl esters of an unsaturated carboxylic acid, hydroxyalkyl esters of an unsaturated carboxylic acid and polyhydric alcohol esters of an unsaturated carboxylic acid. The number of carbon atoms of the alkyl group of the alkyl esters of an unsaturated carboxylic acid is preferably 1 to 18, the number of carbon atoms of the hydroxyalkyl group of the hydroxyalkyl esters of an unsaturated carboxylic acid is preferably 1 to 8, more preferably 2 to 4, and the number of carbon atoms of the polyhydric alcohol moiety of the polyhydric alcohol esters of an unsaturated carboxylic acid is preferably 2 to 12, more preferably 3 to 6.

The above alkyl esters of an unsaturated carboxylic acid include methyl (meth)acrylate, ethyl (meth)acrylate, n-propyl (meth)acrylate, i-propyl (meth)acrylate, n-butyl (meth)acrylate, i-butyl (meth)acrylate, sec-butyl (meth)acrylate, n-amyl (meth)acrylate, i-amyl (meth)acrylate, n-hexyl (meth)acrylate, 2-ethylhexyl (meth)acrylate, n-octyl (meth)acrylate, n-nonyl (meth)acrylate, n-decyl (meth)acrylate, isodecyl (meth)acrylate, n-dodecyl (meth)acrylate and n-octadecyl (meth)acrylate. The number of carbon atoms of the alkyl group of the alkyl esters of an unsaturated carboxylic acid is preferably 1 to 12. The above hydroxyalkyl esters of an unsaturated carboxylic acid include hydroxymethyl (meth) acrylate, 2-hydroxyethyl(meth)acrylate, 2-hydroxypropyl(meth)acrylate, 2-hydroxybutyl (meth)acrylate and 4-hydroxybutyl(meth)acrylate; and the above polyhydric alcohol esters of an unsaturated carboxylic acid include ethylene 2,3-dihydroxypropyl(meth)acrylate and 2,6-dihydroxyhexyl(meth)acrylate.

In the polymer contained in the binder composition for power storage devices of the present invention, the constituent units derived from the compound (a5) may exist alone or in combination of two or more.

1.1.1.6 Recurring Unit Derived from Compound (a6)

The compound (a6) is at least one selected from the group consisting of a conjugated diene compound and an aromatic vinyl compound. The compound (a7) which will be described hereinafter is excluded from the above aromatic vinyl compound.

The polymer contained in the binder composition for power storage devices of the present invention may have a recurring unit derived from the compound (a6). The content of the recurring unit derived from the compound (a6) in the polymer contained in the binder composition for power storage devices of the present invention is preferably not more than 90 mass %, more preferably 30 to 85 mass %, much more preferably 40 to 80 mass % based on 100 mass % of the total of all the recurring units. However, when the polymer contained in the binder composition for power storage devices of the present invention has the recurring unit derived from the above compound (a4), preferably, it does not have the recurring unit derived from this compound (a6).

Since the polymer having the recurring unit derived from the compound (a6) has excellent reduction resistance, a binder composition for power storage devices comprising the polymer can be advantageously used for the manufacture of a negative electrode and also for the manufacture of a protective film in contact with a negative electrode.

Examples of the compound (a6) include conjugated diene compounds such as 1,3-butadiene, 2-methyl-1,3-butadiene, 2,3-dimethyl-1,3-butadiene and 2-chloro-1,3-butadiene; and aromatic vinyl compounds such as styrene, α-methylstyrene, p-methylstyrene, chlorostyrene and hydroxystyrene.

In the polymer contained in the binder composition for power storage devices of the present invention, the constituent units derived from the compound (a6) may exist alone or in combination of two or more.

1.1.1.7 Recurring Unit Derived from Compound (a7)

The compound (a7) is a crosslinkable monomer. The polymer contained in the binder composition for power storage devices of the present invention may have a recurring unit derived from the compound (a7).

The content of the recurring unit derived from the compound (a7) in the polymer contained in the binder composition for power storage devices of the present invention is preferably not more than 5 mass %, more preferably not more than 3 mass % based on 100 mass % of the total of all the recurring units.

Examples of the compound (a7) include divinyl benzene, allyl (meth)acrylate, ethylene glycol di(meth)acrylate, propylene glycol di(meth)acrylate, trimethylolpropane tri(meth)acrylate, pentaerythritol tetra(meth)acrylate and dipentaerythritol hexa(meth)acrylate.

In the polymer contained in the binder composition for power storage devices of the present invention, the constituents units derived from the compound (a7) may exist alone or in combination of two or more.

1.1.1.8 Recurring Unit Derived from Compound (a8)

The compound (a8) is an α-olefin. The polymer contained in the binder composition for power storage devices of the present invention may have a recurring unit derived from the compound (a8).

The content of the recurring unit derived from the compound (a6) in the polymer contained in the binder composition for power storage devices of the present invention is preferably not more than 5 mass %, more preferably not more than 3 mass % based on 100 mass % of the total of all the recurring units.

Examples of the compound (a8) include ethylene, propylene and 1-butene.

1.1.2 Form of Polymer

The polymer contained in the binder composition for power storage devices of the present invention is preferably a polymer having recurring units derived from the compounds (a1), (a2), (a3), (a4) and (a5) and optionally a recurring unit derived from the compound (a7) (to be referred to as "polymer (A)" hereinafter), or a polymer having recurring units derived from the compounds (a1), (a2), (a3), (a5) and (a6) and optionally a recurring unit derived from the compound (a7) (to be referred to as "polymer (B)" hereinafter).

Preferably, the polymers (A) and (B) do not have a recurring unit derived from a monomer except for the above monomers.

1.1.2.1 Polymer (A)

The above polymer (A) may be a polymer obtained by polymerizing a mixture of the above compounds; or polymer alloy particles comprising a polymer (Aa) having (only) a recurring unit derived from the compound (a4) and a polymer (Ab) having recurring units derived from the compounds (a1), (a2), (a3) and (a5) and optionally a recurring unit derived from the compound (a7). When the polymer (A) is a polymer alloy, it can exhibit ion conductivity and oxidation resistance as well as adhesion at the same time advantageously.

The term "polymer alloy" is a "general term for multicomponent polymers obtained by the mixing or chemical bonding of 2 or more polymer components" according to the definition of the fifth edition of Physics and Chemistry Dictionary of Iwanami Shoten and refers to "polymer blends obtained by physically mixing together different polymers, block and graft copolymers obtained by covalently bonding different polymer components, polymer complexes obtained by associating different polymers by intermolecular force and IPN (Interpenetrating Polymer Network) in which different polymers are entangled with one another". However, the polymer alloy contained in the binder composition for power storage devices of the present invention is preferably IPN particles out of the "polymer alloys in which different polymer components are not covalently bonded together".

It is considered that the polymer (Aa) constituting the polymer alloy is excellent in ion conductivity and that the agglomeration of hard segments of a crystalline resin provides a pseudo-crosslinking point such as C—H . . . F—C to the main chain. Therefore, when the polymer (Aa) is used alone as a binder resin, though its ion conductivity and oxidation resistance are high, its adhesion and flexibility are unsatisfactory with the result of low adhesion. Meanwhile, although the polymer (Ab) constituting the polymer alloy has poor oxidation resistance though it is excellent in adhesion and flexibility, when it is used alone as a binder resin, it is decomposed by oxidation to change in quality by repeating charging/discharging, thereby making it impossible to obtain satisfactory charge/discharge characteristics. However, by using a polymer alloy comprising the polymer (Aa) and the polymer (Ab), ion conductivity and oxidation resistance as well as adhesion can be obtained at the same time, thereby making it possible to manufacture a positive electrode and a protective film having excellent charge/discharge characteristics.

When the polymer alloy is measured with a differential scanning calorimeter (DSC) based on JIS K7121, it preferably has only one heat absorption peak at a temperature range of −50 to 250° C. The temperature of this heat absorption peak is more preferably −30 to +30° C.

When the polymer (Aa) constituting the polymer alloy is existent alone, it generally has a heat absorption peak (melting temperature) at −50 to 250° C. In general, the polymer (Ab) constituting the polymer alloy has a heat absorption peak (glass transition temperature) different from that of the polymer (Aa). Therefore, when the polymer (Aa) and the polymer (Ab) in the polymer are existent separate in phase like a core-shell structure, two heat absorption peaks should be observed at −50 to 250° C. When only one heat absorption peak is observed at −50 to 250° C., it can be presumed that the polymer is a polymer alloy.

Further, when the temperature of only one heat absorption peak of the polymer alloy is in the range of −30 to +30° C., the polymer alloy can provide high flexibility and high adhesiveness to the active material layer, thereby further improving adhesion advantageously.

1.1.2.1.1 Polymer (Aa)

The polymer alloy which is the polymer (A1) in the binder composition for power storage devices of the present invention contains the polymer (Aa) having the recurring unit derived from the compound (a4). The monomer inducing the recurring unit constituting this polymer (Aa) is preferably at least one selected from the group consisting of vinylidene fluoride, ethylene tetrafluoride and propylene hexafluoride, most preferably only one of them.

The contents of the recurring units derived from these monomers in the polymer (Aa) based on the total mass of the polymer (Aa) are given below.

The content of the recurring unit derived from vinylidene fluoride in the polymer (Aa) is preferably 50 to 99 mass %, more preferably 70 to 98 mass %, much more preferably 75 to 96 mass %; the content of the recurring unit derived from ethylene tetrafluoride is preferably not more than 50 mass %, more preferably 1 to 30 mass %, much more preferably 2 to 25 mass %; and the content of the recurring unit derived from propylene hexafluoride is preferably not more than 50 mass %, more preferably 1 to 30 mass %, much more preferably 2 to 25 mass %.

1.1.2.1.2 Polymer (Ab)

The polymer alloy which is the polymer (A) in the present invention has recurring units derived from copolymerizable unsaturated monomers except for the compound (a4).

Since it is considered that a component like the polymer (Ab) is generally excellent in adhesion but unsatisfactory in terms of ion conductivity and oxidation resistance, it has not been used in a positive electrode. However, in the present invention, by using the polymer (Ab) in combination with the polymer (Aa) as a polymer alloy, the inventors of the present invention succeeded in obtaining sufficiently high ion conductivity and oxidation resistance while retaining high adhesion.

The content of the recurring unit derived from each monomer in the polymer (Ab) is given below. All the values below are based on 100 mass % of the polymer (Ab).

The content of the recurring unit derived from the compound (a1) is preferably 3 to 40 mass %, more preferably 5 to 30 mass %; the content of the recurring unit derived from the compound (a2) is preferably 1 to 40 mass %, more preferably 4 to 30 mass %; the content of the recurring unit derived from the compound (a3) is preferably 1 to 15 mass %, more preferably 2 to 10 mass %; the content of the recurring unit derived from the compound (a5) is preferably 5 to 95 mass %, more preferably 30 to 89 mass %; and the content of the recurring unit derived from the compound (a7) is preferably not more than 5 mass %, more preferably not more than 3 mass %.

1.1.2.1.3 Production of Polymer Alloy

Although the process of synthesizing the polymer alloy is not particularly limited as long as the polymer alloy which is the polymer (A) contained in the binder composition for power storage devices of the present invention has the above constitution, it is easily synthesized, for example, by known emulsion polymerization processes or a combination thereof.

For example, particles of the polymer (Aa) having the recurring unit derived from the compound (a4) are first synthesized by a known method, the monomers constituting the polymer (Ab) are added to the particles of the polymer (Aa) to be absorbed into the net structure of the particles of the polymer (Aa), and the absorbed monomers are polymerized in the net structure of the polymer (Aa) to synthesize the polymer (Ab), thereby making it possible to produce polymer alloy particles easily. When the polymer alloy is produced by this process, it is essential that the monomers of the polymer (Ab) should be fully absorbed into the polymer (Aa). When the absorption temperature is too low, or when the absorption time is too short, a simple core-shell type polymer or a polymer part of whose surface layer has an IPN structure is obtained, whereby the polymer alloy of the present invention cannot be obtained in most cases. When the absorption temperature is too high, the pressure of the polymerization system becomes too high, which is disadvantageous from the viewpoints of the handling of the reaction system and reaction control. When the absorption time is prolonged excessively, a more advantageous result is not obtained.

From this point of view, the absorption temperature is preferably 30 to 100° C., more preferably 40 to 80° C.; and the absorption time is preferably 1 to 12 hours, more preferably 2 to 8 hours. When the absorption temperature is low, the absorption time is preferably prolonged and when the absorption temperature is high, a short absorption time suffices. Conditions which ensure that a value obtained by multiplying the absorption temperature (° C.) by the absorption time (h) becomes 120 to 300 (° C.·h), preferably 150 to 250 (° C.·h) are suitable.

The operation of absorbing the monomers of the polymer (Ab) into the net structure of particles of the polymer (Aa) is preferably carried out in a known medium used for emulsion polymerization, for example, water.

The content of the polymer (Aa) in the polymer alloy is preferably 3 to 60 mass %, more preferably 5 to 55 mass %, much more preferably 10 to 50 mass %, particularly preferably 20 to 40 mass % based on 100 mass % of the polymer alloy. When the polymer alloy contains the polymer (Aa) within the above range, a good balance between ion conductivity/oxidation resistance and adhesion is obtained. When the polymer (Ab) having the recurring units derived from the monomers within the above preferred ranges is used and the polymer alloy contains the polymer (Aa) within the above range, it is possible to set the contents of the recurring units in the whole polymer alloy to the above preferred ranges, thereby ensuring that the charge/discharge characteristics of a power storage device become excellent.

Polymerization conditions will be described hereinafter.

1.1.2.2 Polymer (B)

The contents of the recurring units derived from the monomers in the polymer (B) are given below. These values are based on 100 mass % of the polymer (B).

The content of the recurring unit derived from the compound (a1) is preferably 3 to 40 mass %, more preferably 5 to 25 mass %; the content of the recurring unit derived from the compound (a2) is preferably 1 to 40 mass %, more preferably 3 to 25 mass %; the content of the recurring unit derived from the compound (a3) is preferably 1 to 15 mass %, more preferably 2 to 10 mass %; the content of the recurring unit derived from the compound (a5) is preferably 4 to 30 mass %, more preferably 5 to 15 mass %; the content of the recurring unit derived from the compound (a6) is preferably not more than 90 mass %, more preferably not more than 85 mass %; and the content of the recurring unit derived from the compound (a7) is preferably not more than 5 mass %, more preferably not more than 3 mass %.

When the polymer particles (B) are measured by DSC, they preferably have only one heat absorption peak at a temperature range of −40 to +25° C. The temperature of the heat absorption peak is preferably −30 to +20° C., more preferably −25 to +10° C. When the polymer particles (B) have only one heat absorption peak according to DSC analysis and the peak temperature falls within the above range, the polymer exhibits high adhesion and can provide suitable flexibility to a thick material layer advantageously.

1.1.3 Production of Polymer

The production of the polymer in the present invention, that is, the polymerization of the polymer (Aa), the polymerization of the polymer (A1b) in the presence of the polymer (Aa), and the polymerization of the polymer (B) may be carried out in the presence of a known emulsifier (surfactant), a polymerization initiator and a molecular weight control agent.

Examples of the above emulsifier include anionic surfactants such as sulfuric acid ester salts of a higher alcohol, alkylbenzene sulfonic acid salts, alkyldiphenyl ether disulfonic acid salts, aliphatic sulfonic acid salts, aliphatic carboxylic acid salts, dehydroabietic acid salts, naphthalene sulfonate•formalin condensates and sulfuric acid ester salts of a nonionic surfactant; nonionic surfactants such as alkyl esters of polyethylene glycol, alkylphenyl ethers of polyethylene glycol and alkyl ethers of polyethylene glycol; and fluorine-based surfactants such as perfluorobutyl sulfonic acid salts, phosphoric acid esters containing a perfluoroalkyl group, carboxylic acid salts containing a perfluoroalkyl group and perfluoroalkyl ethylene oxide adducts. At least one selected from these may be used.

The amount of the emulsifier is preferably 0.01 to 10 parts by mass, more preferably 0.02 to 5 parts by mass based on 100 parts by mass of the total of monomers in use (the total of monomers inducing the polymer (Aa) in the production of the polymer (Aa), the total of monomers inducing the polymer (Ab) when the polymer (Ab) is polymerized in the presence of the polymer (Aa), or the total of monomers inducing the polymer (B) in the production of the polymer (B). The same shall apply hereinafter).

Examples of the above polymerization initiator include water-soluble polymerization initiators such as lithium persulfate, potassium persulfate, sodium persulfate and ammonium persulfate; and oil-soluble polymerization initiators such as cumene hydroperoxide, benzoyl peroxide, t-butyl hydroperoxide, acetyl peroxide, diisopropylbenzene hydroperoxide, 1,1,3,3-tetramethylbutyl hydroperoxide, azobisisobutyronitrile and 1,1'-azobis(cyclohexane carbonitrile). Out of these, potassium persulfate, sodium persulfate, cumene hydroperoxide or t-butyl hydroperoxide is preferably used. The amount of the polymerization initiator is not particularly limited but is suitably determined in consideration of the composition of monomers, pH of the polymerization reaction system and a combination of other additives.

The amount of the polymerization initiator is preferably 0.3 to 3 parts by mass based on 100 parts by mass of the total of the monomers in use.

Examples of the above molecular weight control agent include alkylmercaptans such as n-hexylmercaptan, n-octylmercaptan, t-octylmercaptan, n-dodecylmercaptan, t-dodecylmercaptan and n-stearylmercaptan; xanthogen compounds such as dimethyl xanthogen disulfide and diisopropyl xanthogen disulfide; thiuram compounds such as terpinolene, tetramethylthiuram disulfide, tetraethylthiuram disulfide and tetramethylthiuram monosulfide; phenol compounds such as 2,6-di-t-butyl-4-methylphenol and styrenated phenol; allyl compounds such as allyl alcohol; halogenated hydrocarbon compounds such as dichloromethane, dibromomethane and carbon tetrabromide; vinyl ether compounds such as α-benzyloxy styrene, α-benzyloxy acrylonitrile and α-benzyloxy acrylamide; and triphenylethane, pentaphenylethane, acrolein, methacrolein, thioglycolic acid, thiomalic acid, 2-ethylhexyl thioglycolate and α-methylstyrene dimer. At least one selected from these may be used.

The amount of the molecular weight control agent is preferably not more than 5 parts by mass based on 100 parts by mass of the total of the monomers in use.

Emulsion polymerization is preferably carried out in a suitable aqueous medium, particularly preferably in water. The total content of the monomers in this aqueous medium may be 10 to 50 mass %, preferably 20 to 40 mass %.

The polymerization temperature is preferably 40 to 95° C., more preferably 50 to 85° C. The polymerization time is preferably 1 to 24 hours, more preferably 2 to 18 hours.

The above polymerization may be carried out in a single stage or two stages. When the polymerization is carried out in two stages, the total amount of monomers used in the first-stage polymerization is preferably 20 to 80 mass %, more preferably 40 to 75 mass % based on the total mass of the monomers (the sum of the total mass of monomers used in the first-stage polymerization and the total mass of monomers used in the second-stage polymerization). By carrying out the first-stage polymerization with the monomers in this ratio, polymer particles having excellent dispersion stability and hardly forming an agglomerate can be obtained, and a time rise in the slurry viscosity of the composition can be suppressed advantageously. The types and amounts of the monomers used in the first-stage polymerization and the types and amounts of the monomers used in the second-stage polymerization may be the same or different.

1.1.4 Most Frequent Particle Diameter of Polymer

The polymer contained in the binder composition for power storage devices of the present invention is preferably latex-like polymer particles which are dispersed in a liquid medium. In this case, the most frequency particle diameter of the polymer particles is in the range of preferably 50 to 800 nm, more preferably 75 to 500 nm, particularly preferably 100 to 250 nm. When the most frequent particle diameter of the polymer particles falls within the above range, the polymer particles are adsorbed to the surface of the electrode active material or filler effectively, whereby the polymer particles can move following the movement of the electrode active material or filler. As a result, the migration of only one of them can be suppressed, thereby making it possible to control the deterioration of electric properties.

This most frequency particle diameter is a particle diameter (D50) value that the accumulative number of particles becomes 50% when a particle size distribution is measured with a particle size distribution measuring device employing a light scattering method as a measuring theory to accumulate the particle diameters of particles in the order of smaller ones. Examples of the particle size distribution measuring device include Coulter LS230, LS100 and LS13 320 (of Beckman Coulter. Inc.) and FPAR-1000 (of Otsuka Electronics Co., Ltd.). These particle size distribution measuring devices can evaluate not only primary particles of polymer particles but also secondary particles which are agglomerates of primary particles. Therefore, the particle size distribution measured by these particle size distribution measuring devices can be used as an index of the dispersion state of polymer particles contained in the binder composition for power storage devices.

The most frequent particle diameter of the polymer particles can also be measured by a method in which, after an electrode active material is precipitated by centrifuging electrode slurry or protective film slurry which will be described hereinafter, the obtained supernatant is measured by the above particle size distribution measuring device.

1.2 Liquid Medium

The binder composition for power storage devices of the present invention preferably comprises a liquid medium.

The liquid medium preferably contained in the binder composition for power storage devices of the present invention is preferably an aqueous medium containing water. This aqueous medium may contain a non-aqueous medium except for water. Examples of the non-aqueous medium include amide compounds, hydrocarbons, alcohols, ketones, esters, amine compounds, lactones, sulfoxides and sulfone compounds, at least one selected out of which may be used. When the liquid medium is an aqueous medium containing water and a non-aqueous medium except for water, the content of water is preferably not less than 90 mass %, more preferably not less than 98 mass % based on 100 mass % of the liquid medium.

By using an aqueous medium as the liquid medium in the binder composition for power storage devices of the present invention, the degree of a bad influence upon the environment is reduced, and the safety of a person handling this is enhanced.

The amount of the liquid medium is such that the solid concentration (the ratio of the total mass of components except for the liquid medium contained in the binder composition for power storage devices to the total mass of the binder composition for power storage devices. The same shall apply hereinafter) of the binder composition for power storage devices becomes preferably 5 to 80 mass %, more preferably 10 to 60 mass %.

1.3 Binder Composition for Power Storage Devices

As described above, the binder composition for power storage devices of the present invention is preferably in a latex form in which the polymer particles are dispersed in the liquid medium. When the binder composition for power storage devices is in a latex form, the stability of electrode slurry prepared by blending an electrode active material and the stability of protective film slurry prepared by blending a filler become high and also the coating properties of these slurries become excellent advantageously.

When the binder composition for power storage devices of the present invention is used to manufacture the positive electrode of a power storage device, the polymer contained in this composition is preferably particles of the polymer (A). Meanwhile, when the binder composition for power storage devices of the present invention is used to manufacture the negative electrode of a power storage device, the polymer contained in the composition is preferably particles of the polymer (B).

When the binder composition for power storage devices of the present invention is used to manufacture the protective film of a power storage device, the type of the preferred polymer differs according to the position where the protective film is to be arranged. When the protective film is to be arranged in contact with the positive electrode, the binder composition for power storage devices used for the manufacture of the protective film preferably comprises particles of the polymer (A). When the protective film is to be arranged in contact with the negative electrode, the polymer contained in the binder composition for power storage devices may be either particles of the polymer (A) or particles of the polymer (B).

When the polymer is produced by emulsion polymerization, the obtained latex can be directly used for the preparation of the binder composition for power storage devices in a latex form. Therefore, even when the binder composition for power storage devices of the present invention comprises a polymerization catalyst or residue thereof, residual monomers, emulsifier, surfactant and neutralizer used for the synthesis of the polymer besides the polymer and the liquid medium, the effect of the present invention is not reduced. However, in order to maintain the battery characteristics of the obtained power storage device at a sufficiently high level, the total content of these components derived from the production of the polymer is preferably as low as possible, i.e., not more than 5 mass %, more preferably not more than 1 mass %, much more preferably not more than 0.5 mass %, particularly preferably 0 mass % based on the solid content of the binder composition for power storage devices.

The liquid property of the binder composition for power storage devices of the present invention is preferably almost neutral, more preferably 6.0 to 8.5, particularly preferably 7.0 to 8.0 in terms of pH. The liquid property of the composition can be adjusted by using a known acid or base. Examples of the acid include hydrochloric acid, nitric acid, sulfuric acid and phosphoric acid; and examples of the base include sodium hydroxide, potassium hydroxide, lithium hydroxide and ammonia water.

Therefore, the binder composition for power storage devices of the present invention may comprise the above acid or base in an amount required for the control of its liquid property.

2. Electrode Slurry

Electrode slurry can be produced by using the above binder composition for power storage devices of the present invention. The electrode slurry refers to a dispersion liquid used for the formation of an electrode active material layer on the surface of a collector. The electrode slurry in the present invention contains at least the binder composition for power storage devices of the present invention and an electrode active material.

2.1 Electrode Active Material

The electrode active material for use in the electrode slurry produced by using the binder composition for power storage devices of the present invention is selected from carbon materials, oxides containing a lithium atom, compounds containing a silicon atom, lead compounds, tin compounds, arsenic compounds, antimony compounds, aluminum compounds and polyacene-based organic semiconductors (PAS).

The above carbon materials include amorphous carbon, graphite, natural graphite, mesocarbon microbeads (MCMB) and pitch carbon fibers.

The above oxides containing a lithium atom include lithium cobaltate, lithium nickalate, lithium manganate, ternary nickel-cobalt lithium manganate, $LiFePO_4$, $LiCoPO_4$, $LiMnPO_4$ and $Li_{0.90}Ti_{0.05}Nb_{0.05}Fe_{0.30}Co_{0.30}Mn_{0.30}PO_4$.

The above compounds containing a silicon atom include silicon simple substance, silicon oxide, silicon alloy and silicon materials described in JP-A 2004-185810. The above silicon oxide is preferably a silicon oxide represented by the formula $SiO_x$ ($0<x<2$, preferably $0.1 \leq x \leq 1$). The above silicon alloy is preferably an alloy of silicon and at least one transition metal selected from the group consisting of titanium, zirconium, nickel, copper, iron and molybdenum. Since silicides of the above transition metals have high electron conductivity and high strength, they are preferably used. When the active material contains a transition metal, the transition metal existent on the surface of the active material is oxidized to become an oxide having a hydroxyl group on the surface, thereby improving adhesion force to a binder advantageously. As the silicon alloy, a silicon-nickel alloy or a silicon-titanium alloy is preferably used, and a silicon-titanium alloy is particularly preferably used. The content of silicon in the silicon alloy is preferably not less than 10 mol %, more preferably 20 to 70 mol % based on the total of metal elements contained in the alloy. The compounds containing a silicon atom may be single crystal, polycrystal or amorphous.

The above term "oxide" is a concept meaning a compound or salt comprising oxygen and an element having lower electronegativity than oxygen and including phosphates, nitrates, halogen oxoates and sulfonates of a metal besides metal oxides.

When the binder composition for power storage devices of the present invention is used to manufacture the positive electrode of a power storage device, the active material contained in the electrode slurry is preferably an oxide containing a lithium atom.

When the binder composition for power storage devices of the present invention is used to manufacture the negative electrode of a power storage device, the active material contained in the electrode slurry is preferably a compound containing a silicon atom. Since the silicon atom has high lithium storage capacity, when the active material contains the compound containing a silicon atom, the power storage capacity of the obtained power storage device can be increased. As a result, the output and energy density of the power storage device can be made high. The active material for negative electrodes is preferably a mixture of a compound containing a silicon atom and a carbon material. Since the carbon material has a small volume change caused by charging/discharging, the influence of a volume change of the compound containing a silicon atom can be reduced by using a mixture of the compound containing a silicon atom and the carbon material as the active material for negative electrodes, thereby making it possible to further improve adhesion between the active material layer and the collector. The active material for negative electrodes is particularly preferably a mixture of the compound containing a silicon atom and graphite. The content of the compound containing a silicon atom in the active material is preferably not less than 1 mass %, more preferably 1 to 50 mass %, much more preferably 5 to 45 mass %, particularly preferably 10 to 40 mass %.

When the binder composition for power storage devices of the present invention is used to manufacture an electrode for electric double-layer capacitors, a carbon material, aluminum compound or silicon oxide is preferably used as the active material contained in the electrode slurry.

Further, when the binder composition for power storage devices of the present invention is used to manufacture an electrode for lithium ion capacitors, a carbon material or polyacene-based organic semiconductor (PAS) is preferably used as the active material contained in the electrode slurry.

The active material is preferably particulate. The particle diameter (average median particle diameter) of the particles is preferably 0.1 to 100 µm, more preferably 1 to 20 µm.

The amount of the active material is such that the amount of the polymer contained in the binder composition for power storage devices becomes preferably 0.1 to 25 parts by mass, more preferably 0.5 to 15 parts by mass based on 100 parts by mass of the active material. Within the above range, an electrode having more excellent adhesion, small electrode resistance and excellent charge/discharge characteristics can be manufactured.

2.2 Optional Additive Components

The electrode slurry in the present invention may contain other components as required in addition to the above components. The other components include a conductivity imparting agent, a thickener and a liquid medium (excluding the liquid medium brought from the binder composition for power storage devices).

2.2.1 Conductivity Imparting Agent

Examples of the conductivity imparting agent include carbon for lithium ion secondary batteries. Examples of the carbon include activated carbon, acetylene black, Ketjenblack, furnace black, graphite, carbon fibers and fullerene. Out of these, acetylene black or furnace black may be preferably used. The amount of the conductivity imparting agent is preferably not more than 20 parts by mass, more preferably 1 to 15 parts by mass, particularly preferably 2 to 10 parts by mass based on 100 parts by mass of the active material.

2.2.2 Thickener

The electrode slurry may contain a thickener to improve its coating properties. Examples of the thickener include cellulose derivatives such as carboxymethyl cellulose, methyl cellulose, ethyl cellulose, hydroxymethyl cellulose, hydroxypropylmethyl cellulose and hydroxyethylmethyl cellulose; ammonium salts and alkali metal salts of the above cellulose derivatives; polycarboxylic acids such as poly(meth)acrylic acids and modified poly(meth)acrylic acids; alkali metal salts of the above polycarboxylic acids; polyvinyl alcohol-based (co)polymers such as polyvinyl alcohol, modified polyvinyl alcohol and ethylene-vinyl alcohol copolymers; and water-soluble polymers such as saponified products of copolymers of an unsaturated carboxylic acid such as (meth)acrylic acid, maleic acid or fumaric acid and a vinyl ester.

The amount of the thickener is such that the ratio (Wv/Wa) of the weight (Wv) of the thickener contained in the electrode slurry to the weight (Wa) of the active material becomes 0.001 to 0.1. This ratio (Wv/Wa) is preferably 0.005 to 0.05.

2.2.3 Liquid Medium

Since the electrode slurry contains the binder composition for power storage devices, it contains the liquid medium contained in the binder composition for power storage devices. However, the electrode slurry may further contain a liquid medium in addition to the liquid medium brought from the binder composition for power storage devices.

The liquid medium additionally contained in the electrode slurry may be the same as or different from the liquid medium contained in the binder composition for power storage devices. It is preferably selected from among those enumerated for the liquid medium contained in the binder composition for power storage devices.

The amount of the liquid medium (including the liquid medium brought from the binder composition for power storage devices) in the electrode slurry is such that the solid concentration (the ratio of the total mass of components except for the liquid medium in the electrode slurry to the total mass of the electrode slurry. The same shall apply hereinbelow.) of the electrode slurry becomes 30 to 70 mass %, more preferably 40 to 60 mass % based on the total mass of the electrode slurry.

2.3 Production Process of Electrode Slurry

The electrode slurry may be produced by any method as long as it contains the above components.

However, to produce electrode slurry having high dispersibility and high stability efficiently at a low cost, it can be produced by adding and mixing the active material and optional additive components which are used as required with the binder composition for power storage devices.

To mix the binder composition for power storage devices with the other components, they are stirred by known means.

At least part of the process for the preparation of the electrode slurry (the operation of mixing these components) is preferably carried out under reduced pressure. Thereby, it is possible to prevent air bubbles from being formed in the obtained active material layer. The degree of decompression is preferably $5.0 \times 10^4$ to $5.0 \times 10^5$ Pa as an absolute pressure.

For mixing and stirring for the production of the electrode slurry, a mixer capable of stirring to such an extent that an agglomerate of active material particles does not remain in the slurry and necessary and sufficient dispersion conditions must be selected. Although the degree of dispersion can be measured by means of a grain size gauge, mixing and dispersion are preferably carried out to such an extent that at least an agglomerate larger than 100 µm is gone. Examples of the mixer which meets this condition include a ball mill, bead mill, sand mill, defoaming device, pigment disperser, grinding machine, ultrasonic disperser, homogenizer, planetary mixer and Hobart mixer.

2.4 Method of Manufacturing Electrode for Power Storage Device

The electrode for power storage devices can be manufactured by applying the electrode slurry prepared by using the binder composition for power storage devices of the present invention to the surface of a suitable collector such as metal foil to form a coating film and then removing the liquid medium from the coating film. The electrode manufactured as described above has an active material layer containing the above polymer, the active material and further the optional additive components which are used as required on the collector. The electrode having the layer formed from the above-described electrode slurry on the surface of the collector is excellent in adhesion between the collector and the active material layer and provides a power storage device having excellent charge/discharge characteristics (especially high-speed discharge characteristics).

The collector is not particularly limited as long as it is made of a conductive material. In a lithium ion secondary battery, a collector made of metal such as iron, copper, aluminum, nickel or stainless steel is used. Especially when aluminum is used in a positive electrode and copper is used in a negative electrode, the effect of the slurry for positive electrodes of the present invention becomes most apparent. As the collector of a nickel hydrogen secondary battery, punching metal, expand metal, metal net, foamed metal, net-like metal fiber sintered body or metal plated resin plate is used.

Although the shape and thickness of the collector are not particularly limited, the collector is preferably a sheet having a thickness of 0.001 to 0.5 mm.

The method of applying the electrode slurry to the collector is not particularly limited. Coating is preferably carried out by suitable means such as doctor blade, dipping, reverse roll, direct roll, gravure, extrusion, immersion or brush coating. The coating amount of the electrode slurry is not particularly limited but preferably such that the thickness of the active material layer formed after the removal of the liquid medium is preferably 0.005 to 5 mm, more preferably 0.01 to 2 mm.

The method of removing the liquid medium from the coating film after coating is not particularly limited but preferably drying with warm air, hot air or low-moisture air; vacuum drying; or drying by the irradiation of (far) infrared rays or electron rays. The drying speed can be suitably set such that the liquid medium can be removed as quickly as possible at a speed range in which the active material layer is not cracked by stress concentration or not separated from the collector.

Further, the density of the active material layer is preferably increased by pressing the collector after the removal of the liquid medium. For pressing, a mold press or roll press may be used. The pressing conditions should be suitably set according to the type of the press in use and a desired density value of the active material layer. Although the conditions can be easily set by a small number of preliminary experiments conducted by a person skilled in the art, in the case of a roll press, for example, the feed rate (roll revolution) of the coating film after the removal of the dispersion medium is 1 to 80 m/min, preferably 5 to 50 m/min at a linear pressure of the roll press of 0.1 to 10 t/cm, preferably 0.5 to 5 t/cm and at a roll temperature of 20 to 100° C.

Although the density of the active material layer after pressing cannot be discussed unconditionally as the specific gravity of the active material differs according to the type thereof, the density is preferably set to ensure that the porosity of the active material layer becomes 10 to 50%. When lithium phosphate is used as the active material, the density of the active material layer is preferably 1.5 to 2.5 g/cm$^3$, more preferably 1.7 to 2.1 g/cm$^3$.

When graphite is used as the active material, the density of the active material layer is preferably 1.2 to 1.9 g/cm$^3$, more preferably 1.3 to 1.8 g/cm$^3$.

The coating film after pressing is preferably heated under reduced pressure to completely remove the liquid medium. The degree of decompression in this case is preferably not more than 200 Pa, more preferably not more than 150 Pa as an absolute pressure. The heating temperature is preferably 100 to 200° C., more preferably 120 to 180° C. The heating time is preferably 1 to 24 hours, more preferably 2 to 12 hours.

The electrode for power storage devices manufactured as described above has excellent adhesion between the collector and the active material layer.

3. Protective Film Slurry

The protective film slurry can be produced by using the above binder composition for power storage devices of the present invention. The protective film slurry is a dispersion liquid which is used to form a protective film on the surface of a suitable substrate. The protective film slurry in the present invention contains at least the binder composition for power storage devices of the present invention and a filler.

3.1 Filler

The filler used in the protective film slurry which is produced by using the binder composition for power storage devices of the present invention may be either inorganic particles or organic particles. Out of these, inorganic particles are preferred.

As the filler in the protective film slurry of the present invention, a metal oxide or a semimetal oxide is preferably used, as exemplified by silicon oxide (silica), titanium oxide (titania), aluminum oxide (alumina), zirconium oxide (zirconia) and magnesium oxide (magnesia). The above titanium oxide is preferably rutile type titanium oxide. Out of these, titanium oxide or aluminum oxide is preferably used as the toughness of the formed protective film becomes high.

The most frequent particle diameter (Dc) of the filler in the present invention is preferably not more than 1 μm, more preferably 0.1 to 0.8 μm.

The separator is generally porous. To form a protective film on the surface of the porous separator, the most frequent particle diameter of the filler is preferably larger than the average pore diameter of the pores of the separator. This can prevent the clogging of the filler in the pores of the separator and therefore, does not prevent the movement of ions contained in the electrolytic solution.

The most frequency particle diameter (Dc) of the above filler is a D50 value measured by the same method as the most frequent particle diameter of the polymer particles contained in the binder composition for power storage devices of the present invention. As for the most frequent particle diameter of the filler, the precipitated filler after supernatant obtained by centrifuging the protective film slurry is removed may be measured.

The amount of the filler is such that the amount of the polymer contained in the binder composition for power storage devices becomes 0.1 to 20 parts by mass, more preferably 1 to 10 parts by mass based on 100 parts by mass of the filler. By setting this amount, a protective film having excellent adhesion and small resistance can be produced.

3.2 Optional Additive Components

The protective film slurry in the present invention may contain other components as required in addition to the above components. The other components include a surfactant, a thickener and a liquid medium (excluding the liquid medium brought from the binder composition for power storage devices).

The above surfactant may be contained in the protective film slurry of the present invention in order to further improve the dispersibility and dispersion stability of the protective film slurry. Examples of the surfactant in the protective film slurry include anionic surfactants, cationic surfactants, amphoteric surfactants and nonionic surfactants.

The above anionic surfactants include fatty acid salts, monoalkyl sulfuric acid salts, monoalkyl phosphoric acid salts and alkylbenzene sulfonic acid salts; the above cationic surfactants include alkyltrimethylammonium salts, dialkyldimethylammonium salts and alkylbenzyldimethylammonium salts; the above amphoteric surfactants include alkyldimethylamine oxides and alkylcarboxy betaines; and the above nonionic surfactants include fatty acid sorbitan esters, fatty acid diethanol amides, alkyl polyglycosides, alkyl monoglyceryl ethers, polyoxyethylene alkyl ethers, polyoxyethylene alkylphenyl ethers and polyvinyl alcohol-based polymers. These surfactants may be used alone or in combination of two or more.

The amount of the surfactant is preferably not more than 10 parts by mass, more preferably not more than 5 parts by mass based on 100 parts by mass of the filler.

As for the thickener and the liquid medium, what has been described for the optional additive components in the electrode slurry is applied.

The amount of the liquid medium (including the liquid medium brought from the binder composition for power storage devices) in the protective film slurry is such that the solid concentration (the ratio of the total mass of components except for the liquid medium contained in the protective film slurry to the total mass of the protective film slurry. The same shall apply hereinafter.) of the protective film slurry becomes preferably 10 to 80 mass %, more preferably 15 to 60 mass %.

3.3 Production Process of Protective Film Slurry

The protective film slurry may be produced by any method as long as it contains the above components.

However, in order to produce protective film slurry having high dispersibility and stability efficiently at a low cost, the protective film slurry may be produced by adding and mixing a filler and optional additive components which are used as required with the binder composition for power storage devices.

The same devices as those used in the production process of the electrode slurry may be used to mix the binder composition for power storage devices with the other components.

3.4 Method of Producing Protective Film for Power Storage Devices

The protective film for power storage devices in the present invention can be produced by applying the above protective film slurry to the surface of a positive electrode, a negative electrode or a separator to form a coating film and removing the liquid medium from the coating film.

The above positive electrode and the above negative electrode may have an active material layer formed by using the electrode slurry prepared from the binder composition for power storage devices of the present invention or may be a positive electrode and a negative electrode in the prior art, respectively.

The above separator is a porous body having a large number of pores. The material of the separator is a polyolefin-based polymer such as polyethylene or polypropylene; vinylidene polyfluoride-based polymer such as vinylidene polyfluoride or vinylidene fluoride-hexafluoropropylene copolymer; polyester-based polymer such as polyethylene terephthalate; polyamide-based polymer; polyimide-based polymer; polystyrene-based polymer; polysulfone-based polymer; polyvinyl alcohol-based polymer; polyphenylene ether-based polymer; polyphenylene sulfide-based polymer; cellulose acetate-based polymer; or polyacrylonitrile-based polymer.

As described above, the average pore diameter of the pores of the separator is preferably smaller than the most frequent particle diameter of the filler contained in the protective film slurry. Therefore, the average pore diameter of the pores of the separator is preferably not more than 1 µm, more preferably 0.01 to 0.5 µm. By using the separator having a pore diameter within this range, it is possible to prevent the clogging of the filler in the pores of the separator.

The porosity of the separator is preferably 20 to 80 vol %, more preferably 30 to 75 vol %. By using the separator having a porosity within this range, the output characteristics of a power storage device are not impaired advantageously even when the protective film is formed.

The thickness of the separator is preferably 2 to 50 µm, more preferably 5 to 40 µm. By using the separator having a thickness within this range, work efficiency for forming the protective film becomes high advantageously. By using the separator having a thickness within this range, the occupation volume of the separator after the formation of the protective film does not become too large, whereby the electric storage capacity per volume of the obtained power storage device is not impaired.

The method of coating the protective film slurry may be the same as the method of coating the electrode slurry to the collector. The coating amount of the protective film slurry is preferably such that the thickness of the protective film formed after the liquid medium is removed becomes 0.5 to 3 µm.

By setting the thickness of the protective film to this range, the risk of a short circuit caused by dendrite can be reduced as much as possible without increasing the internal resistance of a power storage device advantageously.

The liquid medium can be removed from the coating film after coating by drying with warm air, hot air or low-moisture air; vacuum drying; or drying by the irradiation of (far) infrared rays or electron rays. The coating film may be dried at a temperature range of preferably 20 to 150° C., more preferably 50 to 150° C. for preferably 1 to 120 minutes, more preferably 5 to 60 minutes.

4. Power Storage Device

The power storage device of the present invention has at least one selected from electrodes (a positive electrode and a negative electrode) for power storage devices and a protective film for power storage devices all of which are produced as described above, further contains an electrolytic solution and can be manufactured by using suitable parts in accordance with a commonly used method.

As a more specific production method, for example, a negative electrode and an electrode are overlapped with each other through a separator, the overlapped electrodes are wound or bent in accordance with the shape of a battery to be stored in a battery container, and an electrolytic solution is injected into the battery container which is then sealed. The shape of the battery may be coin-like, cylindrical, square, laminate-like or other suitable shape.

The electrolytic solution may be liquid or gel. An electrolytic solution capable of exhibiting the function of a battery effectively may be selected from among known electrolytic solutions used in power storage devices according to the types of the negative electrode active material and the electrode active material.

The electrolytic solution may be a solution prepared by dissolving an electrolyte in a suitable solvent.

As the above electrolyte, for example, in a lithium ion secondary battery, conventionally known lithium salts may be used, as exemplified by $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiCF_3SO_3$, $LiCH_3SO_3$, $LiC_4F_9SO_3$, $Li(CF_3SO_2)_2N$ and lower fatty acid lithium carboxylates.

Although the solvent for dissolving the above electrolyte is not particularly limited, examples thereof include carbonate compounds such as propylene carbonate, ethylene carbonate, butylene carbonate, dimethyl carbonate, methyl ethyl carbonate and diethyl carbonate; lactone compounds such as γ-butyl lactone; ether compounds such as trimethoxymethane, 1,2-dimethoxyethane, diethyl ether, 2-ethoxyethane, tetrahydrofuran and 2-methyl tetrahydrofuran; and sulfoxide compounds such as dimethyl sulfoxide, at least one selected out of which may be used.

The concentration of the electrolyte in the electrolytic solution is preferably 0.5 to 3.0 moles/L, more preferably 0.7 to 2.0 moles/L.

With reference to the figures, specific examples of the power storage device of the present invention are described hereinbelow.

FIG. 1 is a schematic sectional view of the most basic structure of the power storage device.

In the power storage device shown in FIG. 1, the separator 3 is sandwiched between the positive electrode 1 and the negative electrode 2. The positive electrode 1 has a structure that a positive electrode active material layer 12 is formed on the surface of a positive electrode collector 11, and the negative electrode 2 has a structure that a negative electrode active material layer 22 is formed on the surface of a negative electrode collector 21. The electrolytic solution (not shown) is existent in the areas of the positive electrode active material layer 12, the negative electrode collector 21 and the separator 3 in such a manner that they are impregnated therewith.

In the power storage device shown in FIG. 1, when at least one of the positive electrode active material layer 12 and the negative electrode collector 21 is formed from the electrode slurry prepared by using the binder composition for power storage devices of the present invention, the power storage device is the power storage device of the present invention.

Figure 2:
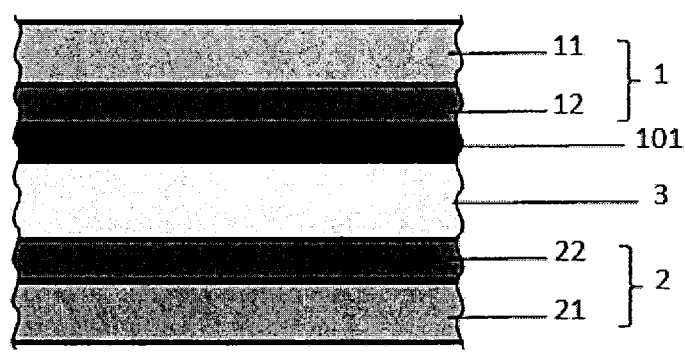
FIG. 2 is a schematic sectional view showing an example of the structure of a power storage device having a protective film.

FIG. 2 is a schematic sectional view of the structure of an example of a power storage device having a protective film.

The power storage device shown in FIG. 2 has a structure that a protective film 101 is formed between the positive electrode 1 and the separator 3 in the power storage device of FIG. 1. This protective film 101 may be formed on the surface of the positive electrode active material layer 12 or on the positive electrode side surface of the separator 3.

Figure 3:
FIG. 3 is a schematic sectional view showing another example of the structure of a power storage device having a protective film.
Figure 4:
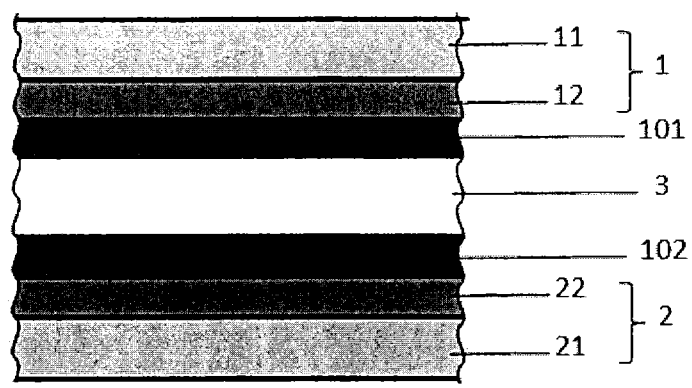
FIG. 4 is a schematic sectional view showing still another example of the structure of a power storage device having protective films.
Figure 5:
FIG. 5 is a schematic sectional view showing the structure of a power storage device having a protective film in place of a separator.

FIGS. 3 to 5 show different power storage devices having a protective film.

The positive electrode active material layer 12 and the negative electrode active material layer 22 in FIGS. 3 to 5 may be formed from the electrode slurry prepared by using the binder composition for power storage devices of the present invention or a binder composition of the prior art.

The power storage device shown in FIG. 3 has a structure that the protective film 102 is formed between the negative electrode 2 and the separator 3 in the power storage device of FIG. 1. This protective film 102 may be formed on the surface of the negative electrode active material layer 22 or on the negative electrode side surface of the separator 3.

The power storage device shown in FIG. 4 has a structure that the protective film 101 is formed between the positive electrode 1 and the separator 3 and the protective film 102 is formed between the negative electrode 2 and the separator 3 in the power storage device of FIG. 1. Although the protective films 101 and 102 may be formed on the surfaces of the active materials, respectively, it is advantageous in terms of the process that they should be formed on both sides of the separator 3.

The thickness of each of the protective films 101 and 102 in the power storage devices of FIGS. 2 to 4 is preferably 0.5 to 10 μm, more preferably 1 to 5 μm.

The power storage device shown in FIG. 5 has a structure that a protective film 103 is sandwiched between the positive electrode 1 and the negative electrode 2. This power storage device does not have a separator; however, the protective film 103 has a function of a separator. In this case, the thickness of the protective film 103 is preferably 5 to 30 μm, more preferably 7 to 20 μm. The power storage device having this protective film 103 can be manufactured, for example, by forming the protective film on the surface of the positive electrode active material layer 12 or the surface of the negative electrode active material layer 22.

EXAMPLES

The following examples are provided for the purpose of further illustrating the present invention but are in no way to be taken as limiting.

In the following examples, the synthesis of polymer particles was carried out repeatedly on the following scale as required to secure a required amount thereof for the subsequent experiments.

<Preparation and Evaluation of Binder Composition>

Example C1

[Preparation of Binder Composition]
(1) Polymerization of Polymer (Aa)

After the inside of an autoclave having an internal capacity of about 6 liters and equipped with an electromagnetic stirrer was fully substituted by nitrogen, 2.5 liters of deoxidized pure water and 25 g of ammonium perfluorodecanoate as an emulsifier were fed to the autoclave and heated up to 60° C. under agitation at 350 rpm. Then, a mixed gas of 70 mass % of vinylidene fluoride (VdDF) and 30 mass % of propylene hexafluoride (HFP) as monomers were charged into the autoclave until the inner pressure reached 20 kg/cm$^2$. Further, 25 g of a Freon 113 (CClF$_2$—CCl$_2$F) solution containing 20 mass % of diisopropyl peroxydicarbonate as a polymerization initiator was injected into the autoclave by using a nitrogen gas to start polymerization. A mixed gas of 60 mass % of VdDF and 40 mass % of HFP was successively injected to ensure that the inner pressure was kept at 20 kg/cm$^2$ during polymerization. As the polymerization speed dropped along with the proceeding of polymerization, 3 hours after the start of polymerization, the same amount as before of the polymerization initiator solution was injected by using a nitrogen gas so as to further continue the reaction for 3 hours. Thereafter, when stirring was stopped at the same time as the cooling of the reaction solution, unreacted monomers were discharged to terminate the reaction, thereby obtaining an aqueous dispersion containing 40 mass % of polymer (Aa) fine particles. When the obtained polymer (Aa) was analyzed by $^{19}$F-NMR, the mass ratio of the monomers was VdF/HFP=21/4.

(2) Preparation of Binder Composition (Synthesis of Polymer Particles, Polymerization of Polymer (Ab))

After the inside of a separable flask having a capacity of 7 liters was fully substituted by nitrogen, 1,600 g (corresponding to 25 parts by mass of the polymer (Aa)) of the aqueous dispersion containing fine particles of the polymer (Aa) obtained in the above step, 0.5 part by mass of Adeka Reasoap SR1025 (trade name, manufactured by ADEKA Corporation) as an emulsifier, 20 parts by mass of cyclohexyl methacrylate (CHMA), 50 parts by mass of 2-ethyl-hexyl acrylate (EHA), 20 parts by mass of acrylonitrile (AN), 8 parts by mass of acrylic acid (AA), 2 parts by mass of ethylene glycol dimethacrylate (EDMA) and 130 parts by mass of water were fed to the separable flask sequentially and stirred at 70° C. for 3 hours to make the polymer (Aa) absorb the monomers. Then, 20 mL of a tetrahydrofuran solution containing 0.5 part by mass of azobisisobutyronitrile which is an oil-soluble polymerization initiator was added and heated at 75° C. to carry out a reaction for 3 hours and further heated at 85° C. to continue the reaction for 2 hours. After the reaction solution was cooled, the reaction was terminated, and the pH of the reaction solution was adjusted to 7.0 with a 2.5N sodium hydroxide aqueous solution to obtain an aqueous dispersion containing 40 mass % of polymer (A) particles (binder composition for power storage devices (C1)).

[Evaluation of Binder Composition]

(1) Measurement of Matter Insoluble in Electrolytic Solution and Degree of Swelling (Electrolytic Solution Immersion Test)

10 g of the binder composition for power storage devices obtained above was weighed and placed on a Teflon (registered trademark) petri dish having a diameter of 8 cm and heated at 120° C. for 1 hour to remove the solvent (water) so as to obtain a film. 1 g of the obtained film (polymer) was immersed in 400 mL of a mixed solution of ethylene carbonate and diethyl carbonate (EC/DEC=½ (volume ratio), this mixed solution will be referred to as "EC/DEC" hereinafter) which was to be used as an electrolytic solution for the manufacture of a power storage device as will be described hereinafter and shaken at 60° C. for 24 hours. When the content of matter insoluble in the electrolytic solution was obtained by the following numerical expression (1) from a measurement value of the weight (Y(g)) of the residue obtained by evaporating and removing dissolved EC/DEC after the obtained product was filtered with a 300-mesh metal net to separate insoluble matter, the content of the matter insoluble in the electrolytic solution of the above polymer particles was 98 mass %. When the degree of swelling with the electrolytic solution was measured by the following numerical expression (2) from a measurement value of the weight (Z (g)) of the insoluble film after EC/DEC adhered to the surface of the insoluble matter (film) separated by the above filtration were absorbed by paper to be removed, the degree of swelling with the electrolytic solution of the above polymer particles was 300 mass %.

Matter insoluble in electrolytic solution(mass %)= $(1-Y)/1) \times 100$     (1)

Degree of swelling with electrolytic solution(mass %)=$(Z/(1-Y)) \times 100$     (2)

(2) DSC Analysis

Further, when the obtained polymer particles were measured by means of a differential scanning calorimeter (DSC), a single glass transition temperature Tg was observed at −2° C. Although the polymer particles were composed of two different polymers, they showed only one Tg. Therefore, it was assumed that they were polymer alloy particles.

(3) Measurement of Most Frequent Particle Diameter of Polymer Particles

The particle size distribution of the above polymer particles was measured by using a particle size distribution measuring device (FPAR-1000 of Otsuka Electronics Co., Ltd.) which employs a dynamic light scattering method as a measuring theory. The most frequent particle diameter obtained from the particle size distribution was 300 nm.

Examples C2 to C11 and Comparative Examples c1 to c7

Aqueous dispersions containing polymer (A) particles having a solid concentration of 40 mass % (binder compositions (C2) to (C11) and (rc1) to (rc7) for power storage devices) were prepared in the same manner as in Example C1 except that the types and amounts of monomers for the synthesis of the polymer (Aa) in "1.(1) polymerization of polymer (Aa)", the amount of the polymer (Aa) and the types and amounts of monomers for the synthesis of the polymer (Ab) in "1.(2) preparation of binder composition" and stirring time for absorbing the monomers into the polymer (Aa) ("stirring time for absorption of monomers" in Table 1) were as shown in Table 1 and that the amount of the emulsifier was adjusted as required. Various evaluations were made in the same manner as in Example C1 except that these binder compositions were used. The evaluation results are shown in Table 1.

Since the operation of making the polymer (Aa) absorb the monomers was not carried out in Examples C6 and C8 and Comparative Example c4, a melting point Tm was observed by DSC analysis in addition to the glass transition temperature Tg. It is assumed that the reason that no glass transition temperature Tg was observed in the DSC analysis of Example C5 and Comparative Examples c5 and c7 is that the polymer (Ab) formed a strong crosslinked structure.

Example C12

150 parts by mass of water and 0.2 part by mass of sodium dodecylbenzene sulfonate were fed to a separable flask having a capacity of 7 liters, and the inside of the separable flask was fully substituted by nitrogen.

Meanwhile, 60 parts by mass of water, 0.8 part by mass in terms of solid content of an ether sulfate emulsifier (Adeka Reasoap SR1025 of ADEKA Corporation) as an emulsifier, and 20 parts by mass of 2,2,2-trifluoroethyl methacrylate (TFEMA), cyclohexyl methacrylate (CHMA), 8 parts by mass of acrylonitrile (AN), 5 parts by mass of methyl methacrylate (MMA), 40 parts by mass of 2-ethylhexyl acrylate (EHA) and 5 parts by mass of acrylic acid (AA) as monomers were added to another vessel and fully stirred to prepare a monomer emulsion containing a mixture of the above monomers.

The heating of the inside of the above separable flask was started, and 0.5 part by mass of ammonium persulfate as a polymerization initiator was added when the inside temperature of the flask reached 60° C. When the inside temperature of the separable flask reached 70° C., the addition of the monomer emulsion prepared above was started, and the monomer emulsion was slowly added over 3 hours while the inside temperature of the separable flask was kept at 70° C. Thereafter, the inside temperature of the separable flask was raised to 85° C. and kept at this temperature for 3 hours to carry out a polymerization reaction. After three hours, the separable flask was cooled to terminate the reaction, and ammonia water was added to adjust pH to 7.6 so as to obtain an aqueous dispersion containing 30 mass % of polymer (B) particles (binder composition (C12) for power storage devices).

Various evaluations were made in the same manner as in Example C1 except that the above binder composition (C12) was used. The evaluation results are shown in Table 2.

Examples C13 and C14 and Comparative Examples c8 to c10

Aqueous dispersions ((binder compositions (C13) and (C14) and (rc8) to (rc10) for power storage devices) containing the polymer (B) particles having a solid concentration of 30 mass % were prepared in the same manner as in Example C12 except that the types and amounts of monomers were as shown in Table 2 and evaluated in the same manner as in Example C1. The evaluation results are shown in Table 2.

Example C15

200 parts by mass of water, 0.6 part by mass of sodium dodecylbenzene sulfonate, 1.0 part by mass of potassium persulfate, 0.5 part by mass of sodium bisulfite, 0.2 part by mass of α-methylstyrene dimer, 0.2 part by mass of dodecylmercaptan and first-stage polymerization components shown in Table 3 were fed in a batch to a temperature controllable autoclave equipped with a stirrer and heated at 70° C. to carry out a polymerization reaction for 2 hours. After it was confirmed that the polymerization conversion ratio became not less than 80 mass %, second-stage polymerization components shown in Table 3 were added over 6 hours while the reaction temperature was kept at 70° C. After 3 hours elapsed from the start of the addition of the second-stage polymerization components, 1.0 part by mass of α-methylstyrene dimer and 0.3 part by mass of dodecylmercaptan were added. After the end of the addition of the second-stage polymerization components, the inside temperature of the autoclave was raised to 80° C. to further continue the reaction for 2 hours to obtain latex.

Thereafter, the pH of the latex was adjusted to 7.5, and 5 parts by mass of sodium tripolyphosphate (in terms of solid content, added as a 10 mass % aqueous solution) was added. Then, the residual monomers were removed by steam distillation, and the reaction product was concentrated under reduced pressure to obtain an aqueous dispersion containing 50 mass % of polymer (B) particles (binder composition (C15)).

Various evaluations were made in the same manner as in Example C1 except that the above binder composition (C15) was used. The evaluation results are shown in Table 3.

Examples C16 and C17

Aqueous dispersions (binder compositions (C16) and (C17) for power storage devices) containing polymer (B) particles having a solid concentration of 50 mass % were prepared by two-stage polymerization in the same manner as in Example C15 except that the types and amounts of the monomers were as shown in Table 3 and evaluated in the same manner as in Example C1. The evaluation results are shown in Table 3.

TABLE 1

Preparation and evaluation of binder compositions for power storage devices

| | | | | Ex. C1 | Ex. C2 | Ex. C3 | Ex. C4 |
|---|---|---|---|---|---|---|---|
| Binder composition for power storage devices | Name of binder composition | | | C1 | C2 | C3 | C4 |
| | Polymer (A) | Compound (a4) | VdDF (parts by mass) | 21 | 4 | 20 | 21 |
| | | | HFP (parts by mass) | 4 | 0.5 | 4.75 | — |
| | | | TFE (parts by mass) | — | 0.5 | — | 3.5 |
| | | | 2VE (parts by mass) | — | — | 0.25 | 0.5 |
| | | | Total amount used (parts by mass) | 25 | 5 | 25 | 25 |
| | Polymer (B) | Compound (a1) | CHMA (parts by mass) | 20 | 3 | 12 | 6 |
| | | | IMA (parts by mass) | — | — | — | — |
| | | | MAdMA (parts by mass) | — | — | — | — |
| | | | CMA (parts by mass) | — | — | — | — |
| | | | Total amount (parts by mass) | 20 | 3 | 12 | 6 |
| | | Compound (a2) | AN (parts by mass) | 20 | 1 | — | 15 |
| | | | MAN (parts by mass) | — | — | 4 | — |
| | | | Total amount (parts by mass) | 20 | 1 | 4 | 15 |
| | | Compound (a3) | AA (parts by mass) | 8 | 4 | — | 6 |
| | | | MAA (parts by mass) | — | — | 2 | — |
| | | | TA (parts by mass) | — | 1 | — | 2 |
| | | | Total amount (parts by mass) | 8 | 5 | 2 | 8 |
| Binder composition for power storage devices | Name of binder composition | | | C1 | C2 | C3 | C4 |
| | Polymer (B) | Compound (a5) | MMA (parts by mass) | — | 20 | 9 | 10 |
| | | | EHA (parts by mass) | 50 | 60 | 60 | 50 |

TABLE 1-continued

Preparation and evaluation of binder compositions for power storage devices

|  |  |  |  |  |  |  |  |
|---|---|---|---|---|---|---|---|
|  |  |  | BA (parts by mass) | — | — | — | 10 |
|  |  |  | EA (parts by mass) | — | 9 | 10 | — |
|  |  |  | HEMA (parts by mass) | — | 2 | 3 | — |
|  |  |  | Total amount (parts by mass) | 50 | 91 | 82 | 70 |
|  |  | Compound (a7) | TMPTMA (parts by mass) | — | — | — | — |
|  |  |  | EDMA (parts by mass) | 2 | — | — | 1 |
|  |  |  | AMA (parts by mass) | — | — | — | — |
|  |  |  | Total amount (parts by mass) | 2 | 0 | 0 | 1 |
|  | Synthesis method |  |  | two-stage polymerization | two-stage polymerization | two-stage polymerization | two-stage polymerization |
|  | Stirring time for absorption of monomers (h) |  |  | 3 | 3 | 3 | 3 |
|  | Most frequent particle diameter of polymer particles (nm) |  |  | 300 | 460 | 850 | 250 |
|  | Electrolytic solution immersion test | Electrolytic solution-insoluble matter(wt %) |  | 98 | 92 | 98 | 97 |
|  |  | Degree of swelling with electrolytic solution(wt %) |  | 300 | 210 | 280 | 280 |
|  | DSC | Tg(° C.) |  | −2 | −25 | −26 | −17 |
|  |  | Tm(° C.) |  | — | — | — | — |

|  |  |  |  | Ex. C5 | Ex. C6 | Ex. C7 | Ex. C8 |
|---|---|---|---|---|---|---|---|
| Binder composition for power storage devices | Name of binder composition |  |  | C5 | C6 | C7 | C8 |
|  | Polymer (A) | Compound (a4) | VdDF (parts by mass) | 21 | 40 | 21 | 21 |
|  |  |  | HFP (parts by mass) | 1.75 | 4 | 1.5 | 1.5 |
|  |  |  | TFE (parts by mass) | 1.75 | 4 | 1.5 | 1.5 |
|  |  |  | 2VE (parts by mass) | 0.5 | 2 | 1 | 1 |
|  |  |  | Total amount used (parts by mass) | 25 | 50 | 25 | 25 |
|  | Polymer (B) | Compound (a1) | CHMA (parts by mass) | 9 | 18 | 40 | 38 |
|  |  |  | IMA (parts by mass) | — | — | — | — |
|  |  |  | MAdMA (parts by mass) | — | — | — | — |
|  |  |  | CMA (parts by mass) | — | — | — | — |
|  |  |  | Total amount (parts by mass) | 9 | 18 | 40 | 38 |
|  |  | Compound (a2) | AN (parts by mass) | 34 | 40 | — | — |
|  |  |  | MAN (parts by mass) | — | — | 2 | 15 |
|  |  |  | Total amount (parts by mass) | 34 | 40 | 2 | 15 |
|  |  | Compound (a3) | AA (parts by mass) | 5 | 9 | 1 | 5 |
|  |  |  | MAA (parts by mass) | 5 | — | — | — |
|  |  |  | TA (parts by mass) | 5 | 1 | — | 2 |
|  |  |  | Total amount (parts by mass) | 15 | 10 | 1 | 7 |

TABLE 1-continued

Preparation and evaluation of binder compositions for power storage devices

| Binder composition for power storage devices | | | | C5 | C6 | C7 | C8 |
|---|---|---|---|---|---|---|---|
| | Polymer (B) | Compound (a5) | MMA (parts by mass) | — | — | — | — |
| | | | EHA (parts by mass) | 37 | 30 | 50 | 39 |
| | | | BA (parts by mass) | — | — | — | — |
| | | | EA (parts by mass) | — | — | 7 | — |
| | | | HEMA (parts by mass) | — | — | — | 0.5 |
| | | | Total amount (parts by mass) | 37 | 30 | 57 | 39.5 |
| | | Compound (a7) | TMPTMA (parts by mass) | — | 1 | — | — |
| | | | EDMA (parts by mass) | 5 | — | — | — |
| | | | AMA (parts by mass) | — | 1 | — | 0.5 |
| | | | Total amount (parts by mass) | 5 | 2 | 0 | 0.5 |
| | Synthesis method | | | two-stage polymerization | two-stage polymerization | two-stage polymerization | two-stage polymerization |
| | Stirring time for absorption of monomers (h) | | | 3 | 0 | 3 | 0 |
| | Most frequent particle diameter of polymer particles (nm) | | | 200 | 80 | 260 | 240 |
| | Electrolytic solution immersion test | | Electrolytic solution-insoluble matter(wt %) | 96 | 90 | 90 | 95 |
| | | | Degree of swelling with electrolytic solution(wt %) | 250 | 190 | 200 | 320 |
| | DSC | | Tg(° C.) | — | 25 | −16 | 8 |
| | | | Tm(° C.) | — | 110 | — | 110 |

| | | | | Ex. C9 | Ex. C10 | Ex. C11 |
|---|---|---|---|---|---|---|
| Binder composition for power storage devices | | Name of binder composition | | C9 | C10 | C11 |
| | Polymer (A) | Compound (a4) | VdDF (parts by mass) | 20 | 20 | 20 |
| | | | HFP (parts by mass) | 4.75 | 4.75 | 4.75 |
| | | | TFE (parts by mass) | — | — | — |
| | | | 2VE (parts by mass) | 0.25 | 0.25 | 0.25 |
| | | | Total amount used (parts by mass) | 25 | 25 | 25 |
| | Polymer (B) | Compound (a1) | CHMA (parts by mass) | — | — | — |
| | | | IMA (parts by mass) | 5 | — | — |
| | | | MAdMA (parts by mass) | — | 5 | — |
| | | | CMA (parts by mass) | — | — | 5 |
| | | | Total amount (parts by mass) | 5 | 5 | 5 |
| | | Compound (a2) | AN (parts by mass) | 8 | 8 | 8 |
| | | | MAN (parts by mass) | — | — | — |
| | | | Total amount (parts by mass) | 8 | 8 | 8 |
| | | Compound (a3) | AA (parts by mass) | 4 | 4 | 4 |

TABLE 1-continued

Preparation and evaluation of binder compositions for power storage devices

| | | | | | | |
|---|---|---|---|---|---|---|
| | | | MAA (parts by mass) | — | — | — |
| | | | TA (parts by mass) | 1 | 1 | 1 |
| | | | Total amount (parts by mass) | 5 | 5 | 5 |
| Binder composition for power storage devices | Name of binder composition | | | C9 | C10 | C11 |
| | Polymer (B) | Compound (a5) | MMA (parts by mass) | 8 | 13 | 13 |
| | | | EHA (parts by mass) | — | — | 10 |
| | | | BA (parts by mass) | 61 | 61 | 56 |
| | | | EA (parts by mass) | 10 | 5 | — |
| | | | HEMA (parts by mass) | 2 | 2 | 2 |
| | | | Total amount (parts by mass) | 81 | 81 | 81 |
| | | Compound (a7) | TMPTMA (parts by mass) | — | — | — |
| | | | EDMA (parts by mass) | 1 | 1 | 1 |
| | | | AMA (parts by mass) | — | — | — |
| | | | Total amount (parts by mass) | 1 | 1 | 1 |
| | Synthesis method | | | two-stage polymerization | two-stage polymerization | two-stage polymerization |
| | Stirring time for absorption of monomers (h) | | | 3 | 3 | 3 |
| | Most frequent particle diameter of polymer particles (nm) | | | 230 | 220 | 240 |
| | Electrolytic solution immersion test | | Electrolytic solution-insoluble matter(wt %) | 96 | 100 | 99 |
| | | | Degree of swelling with electrolytic solution(wt %) | 260 | 250 | 270 |
| | DSC | | Tg(° C.) | −22 | −15 | −10 |
| | | | Tm(° C.) | — | — | — |

| | | | | C. Ex. c1 | C. Ex. c2 | C. Ex. c3 | C. Ex. c4 |
|---|---|---|---|---|---|---|---|
| Binder composition for power storage devices | Name of binder composition | | | rc1 | rc2 | rc3 | rc4 |
| | Polymer (A) | Compound (a4) | VdDF (parts by mass) | 20 | 20 | 20 | 20 |
| | | | HFP (parts by mass) | — | — | — | — |
| | | | TFE (parts by mass) | 5 | 5 | 5 | 5 |
| | | | 2VE (parts by mass) | — | — | — | — |
| | | | Total amount used (parts by mass) | 25 | 25 | 25 | 25 |
| | Polymer (B) | Compound (a1) | CHMA (parts by mass) | — | — | — | 20 |
| | | | IMA (parts by mass) | — | — | — | — |
| | | | MAdMA (parts by mass) | — | — | — | — |
| | | | CMA (parts by mass) | — | — | — | — |
| | | | Total amount (parts by mass) | 0 | 0 | 0 | 20 |
| | | Compound (a2) | AN (parts by mass) | — | 18 | 55 | — |
| | | | MAN (parts by mass) | — | — | — | — |
| | | | Total amount (parts by mass) | 0 | 18 | 55 | 0 |

TABLE 1-continued

Preparation and evaluation of binder compositions for power storage devices

|  |  |  |  |  |  |  |  |
|---|---|---|---|---|---|---|---|
|  |  | Compound (a3) | AA (parts by mass) | 4 | 4 | 4 | 4 |
|  |  |  | MAA (parts by mass) | — | — | — | — |
|  |  |  | TA (parts by mass) | 1 | 1 | 1 | 1 |
|  |  |  | Total amount (parts by mass) | 5 | 5 | 5 | 5 |
| Binder composition for power storage devices | Name of binder composition |  |  | rc2 | rc3 | rc4 | rc4 |
|  | Polymer (B) | Compound (a5) | MMA (parts by mass) | 40 | 25 | — | — |
|  |  |  | EHA (parts by mass) | 55 | 50 | 39 | — |
|  |  |  | BA (parts by mass) | — | — | — | 50 |
|  |  |  | EA (parts by mass) | — | — | — | 22 |
|  |  |  | HEMA (parts by mass) | — | — | — | 3 |
|  |  |  | Total amount (parts by mass) | 95 | 75 | 39 | 75 |
|  |  | Compound (a7) | TMPTMA (parts by mass) | — | — | — | — |
|  |  |  | EDMA (parts by mass) | — | 2 | — | — |
|  |  |  | AMA (parts by mass) | — | — | 1 | — |
|  |  |  | Total amount (parts by mass) | 0 | 2 | 1 | 0 |
|  | Synthesis method |  |  | two-stage polymerization | two-stage polymerization | two-stage polymerization | two-stage polymerization |
|  | Stirring time for absorption of monomers (h) |  |  | 3 | 3 | 3 | 0 |
|  | Most frequent particle diameter of polymer particles (nm) |  |  | 250 | 220 | 420 | 190 |
|  | Electrolytic solution immersion test | Electrolytic solution-insoluble matter(wt %) |  | 75 | 68 | 25 | 81 |
|  |  | Degree of swelling with electrolytic solution(wt %) |  | 280 | 520 | 1050 | 140 |
|  | DSC | Tg(° C.) |  | −16 | −5 | 15 | −17 |
|  |  | Tm(° C.) |  | — | — | — | 100 |

|  |  |  |  | C. Ex. c5 | C. Ex. c6 | C. Ex. c7 |
|---|---|---|---|---|---|---|
| Binder composition for power storage devices | Name of binder composition |  |  | rc5 | rc6 | rc7 |
|  | Polymer (A) | Compound (a4) | VdDF (parts by mass) | 20 | 20 | 20 |
|  |  |  | HFP (parts by mass) | — | — | — |
|  |  |  | TFE (parts by mass) | 5 | 5 | 5 |
|  |  |  | 2VE (parts by mass) | — | — | — |
|  |  |  | Total amount used (parts by mass) | 25 | 25 | 25 |
|  | Polymer (B) | Compound (a1) | CHMA (parts by mass) | 20 | 50 | 50 |
|  |  |  | IMA (parts by mass) | — | — | — |
|  |  |  | MAdMA (parts by mass) | — | — | — |
|  |  |  | CMA (parts by mass) | — | — | — |
|  |  |  | Total amount (parts by mass) | 20 | 50 | 50 |
|  |  | Compound (a2) | AN (parts by mass) | 45 | 0.5 | 12 |

TABLE 1-continued

Preparation and evaluation of binder compositions for power storage devices

|  |  |  |  |  |  |  |
|---|---|---|---|---|---|---|
|  |  |  | MAN (parts by mass) | — | — | — |
|  |  |  | Total amount (parts by mass) | 45 | 0.5 | 12 |
|  |  | Compound (a3) | AA (parts by mass) | 4 | 4 | 4 |
|  |  |  | MAA (parts by mass) | — | — | — |
|  |  |  | TA (parts by mass) | 1 | 1 | 1 |
|  |  |  | Total amount (parts by mass) | 5 | 5 | 5 |
| Binder composition for power storage devices | Name of binder composition |  |  | rc5 | rc6 | rc7 |
|  | Polymer (B) | Compound (a5) | MMA (parts by mass) | — | 11.5 | — |
|  |  |  | EHA (parts by mass) | — | 33 | — |
|  |  |  | BA (parts by mass) | 24 | — | 23 |
|  |  |  | EA (parts by mass) | — | — | — |
|  |  |  | HEMA (parts by mass) | — | — | — |
|  |  |  | Total amount (parts by mass) | 24 | 44.5 | 23 |
|  |  | Compound (a7) | TMPTMA (parts by mass) | — | — | — |
|  |  |  | EDMA (parts by mass) | 6 | — | 10 |
|  |  |  | AMA (parts by mass) | — | — | — |
|  |  |  | Total amount (parts by mass) | 6 | 0 | 10 |
|  | Synthesis method |  |  | two-stage polymerization | two-stage polymerization | two-stage polymerization |
|  | Stirring time for absorption of monomers (h) |  |  | 3 | 3 | 3 |
|  | Most frequent particle diameter of polymer particles (nm) |  |  | 380 | 250 | 220 |
|  | Electrolytic solution immersion test |  | Electrolytic solution-insoluble matter(wt %) | 99 | 95 | 99 |
|  |  |  | Degree of swelling with electrolytic solution(wt %) | 120 | 130 | 160 |
|  | DSC |  | Tg(° C.) | — | 25 | — |
|  |  |  | Tm(° C.) | — | — | — |

Ex.: Example
C. Ex.: Comparative Example

TABLE 2

Preparation and evaluation of binder compositions for power storage devices

|  |  |  |  | Ex. C12 | Ex. C13 | Ex. C14 |
|---|---|---|---|---|---|---|
| Binder composition for power storage devices | Name of binder composition |  |  | C12 | C13 | C1 |
|  | Compound (a1) | CHMA | (parts by mass) | 11 | 11 | 16 |
|  |  | Total amount | (parts by mass) | 11 | 11 | 16 |
|  | Compound (a2) | AN | (parts by mass) | 8 | — | 8 |
|  |  | MAN | (parts by mass) | — | 8 | — |
|  |  | Total amount | (parts by mass) | 8 | 8 | 8 |
|  | Compound (a3) | AA | (parts by mass) | 5 | — | 4 |

TABLE 2-continued

Preparation and evaluation of binder compositions for power storage devices

| | | | | | | |
|---|---|---|---|---|---|---|
| | | | MAA (parts by mass) | — | 6 | — |
| | | | TA (parts by mass) | — | — | 1 |
| | | | Total amount (parts by mass) | 5 | 6 | 5 |
| | Compound (a4) | | TFEMA (parts by mass) | 20 | — | — |
| | | | TFEA (parts by mass) | — | 40 | — |
| | | | HFIPA (parts by mass) | — | — | 5 |
| | | | Total amount (parts by mass) | 20 | 40 | 5 |
| Binder composition for power storage devices | | Name of binder composition | | C12 | C13 | C1 |
| | Compound (a5) | | MMA (parts by mass) | 5 | — | 10 |
| | | | EHA (parts by mass) | 50 | 35 | — |
| | | | BA (parts by mass) | — | — | 55 |
| | | | Total amount (parts by mass) | 55 | 35 | 65 |
| | Compound (a6) | | BD (parts by mass) | — | — | — |
| | | | ST (parts by mass) | — | — | — |
| | Compound (a7) | | DVB (parts by mass) | — | — | — |
| | | | EDMA (parts by mass) | 1 | — | — |
| | | | AMA (parts by mass) | — | — | 1 |
| | | | Total amount (parts by mass) | 1 | 0 | 1 |
| | | Synthesis method | | single-stage polymerization | single-stage polymerization | single-stage polymerization |
| | | Average particle diameter(nm) | | 180 | 220 | 120 |
| | Electrolytic solution immersion test | Electrolytic solution-insoluble matter(wt %) | | 88 | 85 | 88 |
| | | Degree of swelling with electrolytic solution(wt %) | | 380 | 410 | 420 |
| | DSC | Tg(° C.) | | −12 | −16 | −4 |
| | | Tm(° C.) | | — | — | — |

| | | | | C. Ex. c8 | C. Ex. c9 | C. Ex. c10 |
|---|---|---|---|---|---|---|
| Binder composition for power storage devices | | Name of binder composition | | rc8 | rc9 | rc10 |
| | Compound (a1) | | CHMA (parts by mass) | 58 | — | 10 |
| | | | Total amount (parts by mass) | 58 | 0 | 10 |
| | Compound (a2) | | AN (parts by mass) | — | 12 | 0 |
| | | | MAN (parts by mass) | — | — | — |
| | | | Total amount (parts by mass) | 0 | 12 | 0 |
| | Compound (a3) | | AA (parts by mass) | — | 1 | 2 |
| | | | MAA (parts by mass) | 2 | — | — |
| | | | TA (parts by mass) | — | 2 | 2 |
| | | | Total amount (parts by mass) | 2 | 3 | 4 |
| | Compound (a4) | | TFEMA (parts by mass) | — | — | — |

TABLE 2-continued

Preparation and evaluation of binder compositions for power storage devices

|  |  |  |  |  |  |
|---|---|---|---|---|---|
|  |  | TFEA (parts by mass) | — | — | — |
|  |  | HFIPA (parts by mass) | — | — | — |
|  |  | Total amount (parts by mass) | 0 | 0 | 0 |
| Binder composition for power storage devices |  | Name of binder composition | rc8 | rc9 | rc10 |
|  | Compound (a5) | MMA (parts by mass) | — | 10 | 10 |
|  |  | EHA (parts by mass) | 40 | — | — |
|  |  | BA (parts by mass) | — | — | — |
|  |  | Total amount (parts by mass) | 40 | 10 | 10 |
|  | Compound (a6) | BD (parts by mass) | — | 40 | 40 |
|  |  | ST (parts by mass) | — | 35 | 35 |
|  | Compound (a7) | DVB (parts by mass) | — | — | 1 |
|  |  | EDMA (parts by mass) | — | — | — |
|  |  | AMA (parts by mass) | — | — | — |
|  |  | Total amount (parts by mass) | 0 | 0 | 1 |
|  |  | Synthesis method | single-stage polymerization | single-stage polymerization | single-stage polymerization |
|  |  | Average particle diameter(nm) | 220 | 150 | 150 |
|  | Electrolytic solution immersion test | Electrolytic solution-insoluble matter(wt %) | 99 | 88 | 95 |
|  |  | Degree of swelling with electrolytic solution(wt %) | 140 | 280 | 150 |
|  | DSC | Tg(° C.) | 8 | −15 | −9 |
|  |  | Tm(° C.) | — | — | — |

Ex.: Example
C. Ex.: Comparative Example

TABLE 3

Preparation and evaluation of binder compositions for power storage devices

|  |  |  | Ex. C15 | Ex. C16 | Ex. C17 |
|---|---|---|---|---|---|
|  |  | Name of binder composition | C15 | C16 | C17 |
| First-stage polymerization components | Compound (a1) | CHMA(parts by mass) | 1.0 | — | 5.0 |
|  | Compound (a2) | AN(parts by mass) | 4.0 | 4.0 | 2.0 |
|  | Compound (a3) | AA(parts by mass) | 2.0 | 0.2 | — |
|  |  | MAA(parts by mass) | — | — | 1.0 |
|  |  | TA(parts by mass) | 1.0 | 2.0 | — |
|  | Compound (a5) | MMA(parts by mass) | 4.0 | 9.0 | 6.0 |
|  |  | HEMA(parts by mass) | 1.0 | — | — |
|  | Compound (a6) | BD(parts by mass) | 10.0 | 7.0 | 17.0 |
|  |  | ST(parts by mass) | 10.0 | 3.8 | 12.0 |
|  | Compound (a7) | DVB(parts by mass) | — | 1.0 | — |
|  |  | Total of first stage | 33.0 | 27.0 | 43.0 |
| Second polymerization components | Compound (a1) | CHMA(parts by. mass) | 4.0 | 15.0 | 20.0 |
|  | Compound (a2) | AN(parts by mass) | 8.0 | 20.0 | 4.0 |
|  | Compound (a3) | AA(parts by mass) | — | 0.8 | 3.0 |
|  |  | MAA(parts by mass) | — | — | — |
|  |  | TA(parts by mass) | — | — | — |
|  | Compound (a5) | MMA(parts by mass) | — | 3.0 | — |
|  |  | HEMA(parts by mass) | — | — | — |

TABLE 3-continued

Preparation and evaluation of binder compositions for power storage devices

|  |  |  | Ex. C15 | Ex. C16 | Ex. C17 |
|---|---|---|---|---|---|
|  | Compound (a6) | BD(parts by mass) | 35.0 | 23.0 | 18.0 |
|  |  | ST(parts by mass) | 20.0 | 11.2 | 12.0 |
|  | Compound (a7) | DVB(parts by mass) | — | — | — |
|  |  | Total of second stage | 67.0 | 73.0 | 57.0 |
|  |  | Name of binder composition | C15 | C16 | C17 |
| First-stage and second-stage polymerization components | Compound (a1) | CHMA(parts by mass) | 5.0 | 15.0 | 25.0 |
|  | Compound (a2) | AN(parts by mass) | 12.0 | 24.0 | 6.0 |
|  | Compound (a3) | AA(parts by mass) | 2.0 | 1.0 | 3.0 |
|  |  | MAA(parts by mass) | — | — | 1.0 |
|  |  | TA(parts by mass) | 1.0 | 2.0 | — |
|  | Compound (a5) | MMA(parts by mass) | 4.0 | 12.0 | 6.0 |
|  |  | HEMA(parts by mass) | 1.0 | — | — |
|  | Compound (a6) | BD(parts by mass) | 45.0 | 30.0 | 35.0 |
|  |  | ST(parts by mass) | 30.0 | 15.0 | 24.0 |
|  | Compound (a7) | DVB(parts by mass) | — | 1.0 | — |
|  |  | Total of first stage and second stage | 100.0 | 100.0 | 100.0 |
|  |  | Synthesis method | two-stage polymerization | two-stage polymerization | two-stage polymerization |
|  |  | Average particle diameter(nm) | 120 | 150 | 180 |
| Electrolytic solution immersion test | Electrolytic solution-insoluble matter(wt %) |  | 83 | 80 | 81 |
|  | Degree of swelling with electrolytic solution(wt %) |  | 450 | 550 | 500 |
| DSC | Tg(° C.) |  | −27 | 4 | −6 |
|  | Tm(° C.) |  | — | — | — |

Ex.: Example

The abbreviations of monomers in Tables 1 to 3 mean the following. "—" in the columns for monomers means that the monomer was not used or the evaluation value of the monomer was not observed.

<compound (a1)>
CHMA: cyclohexyl methacrylate
IMA: isobornyl methacrylate
MAdMA: 2-(2-methyladamantyl) methacrylate
CMA: 3-cholesteryl methacrylate <compound (a2)>
AN: acrylonitrile
MAN: methacrylonitrile <compound (a3)>
AA: acrylic acid
MAA: methacrylic acid
TA: itaconic acid <compound (a4)>
VdDF: vinylidene fluoride
HFP: propylene hexafluoride
TFE: ethylene tetrafluoride
2VE: 1,1,2,2-tetrafluoro-1,2-bis((trifluorovinyl)oxy)ethane
TFEMA: 2,2,2-trifluoroethyl methacrylate
TFEA: 2,2,2-trifluoroethyl acrylate
HFIPA: 1,1,1,3,3,3-hexafluoroisopropyl acrylate <compound (a5)>
MMA: methyl methacrylate
EHA: 2-ethylhexyl acrylate
BA: n-butyl acrylate
EA: ethyl acrylate
HEMA: 2-hydroxyethyl methacrylate <compound (a6)>
BD: 1,3-butadiene
ST: styrene <compound (a7)>
DVB: divinyl benzene
TMPTMA: trimethylolpropane trimethacrylate
EDMA: ethylene glycol dimethacrylate
AMA: allyl methacrylate <Use of Binder Composition for Electrode>

Example E1

1. Production and Evaluation of Positive Electrode
(1) Preparation of Positive Electrode Slurry 2 parts by mass (in terms of solid content) of a 6 mass % aqueous solution of a thickener (CMC1120 of Daicel Corporation), 100 parts by mass of an electrode active material (particles having a particle diameter (D50) of 0.5 μm obtained by pounding commercially available iron lithium phosphate (LiFePO$_4$) in an agate mortar and classifying the obtained particles by using a sieve), 3 parts by mass of acetylene black as a conductivity imparting agent and 15 parts by mass of water were injected into a double-screw planetary mixer (TK HIVIS MIX 2P-03 of PRIMIX Corporation) and stirred at 90 rpm for 1 hour. Then, the binder composition (C1) for power storage devices obtained in the above Example C1 was added to ensure that the content of the polymer particles in the composition became 4 parts by mass, and further 85 parts by mass of water was added and stirred for 1 hour to obtain paste. After water was added to the obtained paste to adjust its solid concentration to 40 mass %, a stirring defoaming device (Awatori Nentaro of THINKY Corporation) was used to stir and mix the paste at 200 rpm for 2 minutes, at 1,800 rpm for 5 minutes and further at 1,800 rpm for 1.5 minutes under reduced pressure (about 5×10$^3$ Pa) to prepare positive electrode slurry.

(2) Manufacture of Positive Electrode

The positive electrode slurry prepared above was uniformly applied to the surface of a collector composed of aluminum foil having a thickness of 30 μm with a doctor blade to a film thickness after drying of 100 μm and dried at 120° C. for 20 minutes. Thereafter, the dried film was pressed with a roll press to ensure that the density of the film (electrode active material layer) became 1.9 g/cm$^3$ and vacuum dried at 150° C. under an absolute reduced pressure of 75 Pa for 4 hours to obtain a positive electrode.

(3) Measurement of Peel Strength

A test sample having a width of 2 cm and a length of 12 cm was cut out from the obtained positive electrode and the surface on the electrode active material layer side of the test sample was attached to an aluminum sheet by using a double-coated tape having a width of 25 mm (NICETACK (registered trademark) of Nichiban Co., Ltd.). Meanwhile, tape having a width of 18 mm (CELLOTAPE (registered trademark) of Nichiban Co., Ltd., based on JIS 21522) was attached to the surface of the collector of the test sample. When force (N/m) for peeling 2 cm of this tape having a width of 18 mm in a 90° direction at a speed of 50 mm/min was measured 6 times to calculate the average value of the measurement data as adhesion strength (peel strength, N/m), it was 31 N/m.

It can be evaluated that as the value of this peel strength is larger, adhesion strength between the collector and the electrode active material layer becomes higher and the electrode active material layer is hardly separated from the collector. Quantitatively, it can be judged that when the value of peel strength is not less than 15 N/m, adhesion strength is high.

2. Manufacture of Negative Electrode (1) Preparation of Negative Electrode Slurry 1 part by mass (in terms of solid content) of a 6 mass % aqueous solution of a thickener (CMC1120 of Daicel Corporation), 100 parts by mass of graphite as a negative electrode active material, 4 parts by mass of acetylene black as a conductivity imparting agent and 55 parts by mass of ion exchange water were injected into a double-screw planetary mixer (TK HIVIS MIX 2P-03 of PRIMIX Corporation) and stirred at 60 rpm for 1 hour. Thereafter, the binder composition (C1) for power storage devices obtained in the above Example C1 was added to ensure that the content of the polymer particles in the composition became 2 parts by mass, and 35 parts by mass of ion exchange water was further added and stirred for 1 hour to obtain paste. Ion exchange water was added to the obtained paste to adjust its solid concentration to 50 mass %, and a stirring defoaming device (Awatori Nentaro of THINKY Corporation) was used to stir and mix the paste at 200 rpm for 2 minutes, at 1,800 rpm for 5 minutes and further at 1,800 rpm for 1.5 minutes under reduced pressure (about 5×10$^3$ Pa) to prepare negative electrode slurry.

(2) Manufacture of Negative Electrode

The negative electrode slurry prepared above was uniformly applied to the surface of a collector composed of aluminum foil having a thickness of 15 μm with a doctor blade to a film thickness after drying of 80 μm and dried at 120° C. for 20 minutes. Thereafter, the dried film was pressed with a roll press to ensure that the density of the film became 1.5 g/cm$^3$ and vacuum dried at 150° C. under an absolute reduced pressure of 75 Pa for 4 hours to obtain a negative electrode.

3. Manufacture and Evaluation of Power Storage Device (1) Assembly of Lithium Ion Secondary Battery Cell A product having a diameter of 16.16 mm punched out from the negative electrode manufactured in "3. (2) manufacture of negative electrode" was mounted on a bipolar coin cell (HS Flat Cell of Hohsen Corporation) in a glove box substituted by Ar to ensure that the dew point became −80° C. or lower. Then, a product having a diameter of 24 mm punched out from a separator (Celgard #2400 of Celgard LLC.) which is composed of a polypropylene porous film was mounted on the negative electrode, 500 μL of an electrolytic solution was injected such that air was not contained therein, a product having a diameter of 15.95 mm punched out from the positive electrode manufactured in "1.(2) manufacture of positive electrode" was mounted on the separator, and the exterior body of the above bipolar coin cell was sealed with a screw to assemble a lithium ion secondary battery cell (power storage device). The electrolytic solution used herein was an EC/DEC solution prepared by dissolving LiPF$_6$ to a concentration of 1 mol/L.

(2) Evaluation of Charge/Discharge Rate Characteristic (5C Rate Characteristic)

The battery cell manufactured above was put into a 25° C. thermostat tank, and charging was started at a constant current (0.2C), continued at a constant voltage (4.1 V) when the voltage became 4.1 V and completed (cut off) when the current value became 0.01 C. Then, discharging was started at a constant current (0.2 C) and completed (cut off) when the voltage became 2.5 V (aging charge/discharge).

Thereafter, while the same cell after the above aging charge/discharge was kept in the 25° C. thermostat tank, charging was started at a constant current (0.2 C), continued at a constant voltage (4.1 V) when the voltage became 4.1 V and completed (cut off) when the current value became 0.01 C to measure charge capacity at 0.2 C. Then, discharging was started at a constant current (0.2 C) and completed (cut off) when the voltage became 2.5 V to measure discharge capacity (C1) at 0.2 C.

Subsequently, while the same cell after charging/discharging at 0.2 C was kept in the 25° C. thermostat tank, charging was started at a constant current (0.2 C), continued at a constant voltage (4.1 V) when the voltage became 4.1 V and completed (cut off) when the current value became 0.01 C to measure charge capacity at 0.2 C. Then, discharging was started at a constant current (5.0 C) and completed (cut off) when the voltage became 2.5 V to measure discharge capacity (C2) at 5.0 C.

When the 5C rate characteristic of the power storage device was calculated from the following numerical expression (3) by using the above measurement values, it was 82%.

$$5C \text{ rate characteristic } (\%) = (C2)/(C1) \times 100 \quad (3)$$

It can be judged that as the 5C rate characteristic value becomes larger, excellent output characteristics are obtained even at high-speed discharge. Especially when the 5C rate characteristic value is not less than 60%, it can be judged that the above characteristics are excellent.

"1C" as a measurement condition means a current value at which discharging ends in 1 hour when a cell having a certain electric capacitance is discharged at a constant current. For example, "0.1 C" means a current value at which discharging ends in 10 hours and "10 C" means a current value at which discharging ends in 0.1 hour (the same shall apply hereinafter).

(3) Measurement of Remaining Capacity Rate and Increase Rate of Resistance

While the cell after the measurement of 5C rate characteristic was kept in the 25° C. thermostat tank, charging was started at a constant current (0.2 C), continued at a constant voltage (4.1 V) when the voltage became 4.1 V and completed (cut off) when the current value became 0.01 C.

The electrochemical impedance spectroscopy (EIS) of this charged cell was carried out to measure the initial resistance value EISa.

Then, the cell after the measurement of the initial resistance value EISa was put into a 60° C. thermostat tank, and charging was started at a constant current (0.2 C) and continued at a constant voltage (4.4 V) when the voltage became 4.4 V for 240 hours (overcharge acceleration test).

After this charged cell was put into a 25° C. thermostat tank to reduce the temperature of the cell to 25° C., discharging was started at a constant current (0.2 C) and completed (cut off) when the voltage became 2.5 V to measure C2 which is a value of discharge capacity (after the test) at 0.2 C.

Further, while the cell after the measurement of C2 was kept in the 25° C. thermostat tank, charging was started at a constant current (0.2C), continued at a constant voltage (4.1 V) when the voltage became 4.1 V and completed (cut off) when the current value became 0.01 C. Then, discharging was started at a constant current (0.2 C) and completed (cut off) when the voltage became 2.5 V.

The EIS measurement of this cell was carried out to measure EISb which is a resistance value after the application of thermal stress and overcharge stress.

The remaining capacity rate obtained by inserting the above measurement values into the following numerical expression (4) was 96%, and the increase rate of resistance obtained by inserting the above measurement values into the following numerical expression (5) was 35%.

$$\text{Remaining capacity rate (\%)} = (C2/C1) \times 100 \quad (4)$$

$$\text{Increase rate of resistance (\%)} = ((EISb - EISa)/EISa) \times 100 \quad (5)$$

When the remaining capacity rate is not less than 75% and the increase rate of resistance is not more than 300%, it can be evaluated that the power storage device is excellent in resistance to thermal stress and overcharge. The above increase rate of resistance is preferably not more than 225%, more preferably not more than 150%, much more preferably not more than 100%.

Examples E2 to E17 and Comparative Examples e1 to e10

Power storage devices were manufactured and evaluated in the same manner as in Example 1 except that the binder compositions (C2) to (C17) and (rc1) to (rc10) obtained in the above Examples C2 to C17 and Comparative Examples c1 to c10 were used in place of the binder composition (C1) for power storage devices in Example E1. The evaluation results are shown in Table 4.

TABLE 4

Evaluation results of electrodes and power storage devices

| | | Ex. E1 | Ex. E2 | Ex. E3 | Ex. E4 | Ex. E5 | Ex. E6 | Ex. E7 | Ex. E8 | Ex. E9 |
|---|---|---|---|---|---|---|---|---|---|---|
| Name of binder composition for power storage devices | | C1 | C2 | C3 | C4 | C5 | C6 | C7 | C8 | C9 |
| Electrode characteristics (positive electrode) | Peel strength (N/m) | 31 | 26 | 34 | 33 | 31 | 25 | 27 | 31 | 21 |
| Power storage device | 5 C rate characteristic (%) | 82 | 74 | 81 | 84 | 81 | 76 | 71 | 82 | 82 |
| | Remaining capacity rate (%) | 96 | 91 | 96 | 95 | 98 | 90 | 94 | 96 | 96 |
| | Increase rate of resistance (%) | 35 | 78 | 38 | 48 | 38 | 96 | 53 | 29 | 49 |

| | | Ex E10 | Ex. E11 | Ex. E12 | Ex. E13 | Ex. E14 | Ex. E15 | Ex. E16 | Ex. E17 | C. Ex. e1 |
|---|---|---|---|---|---|---|---|---|---|---|
| Name of binder composition for power storage devices | | C10 | C11 | C12 | C13 | C14 | C15 | C16 | C17 | rc1 |
| Electrode characteristics (positive electrode) | Peel strength (N/m) | 20 | 23 | 18 | 16 | 19 | 34 | 35 | 36 | 21 |
| Power storage device | 5 C rate characteristic (%) | 81 | 83 | 68 | 66 | 69 | 61 | 63 | 62 | 71 |
| | Remaining capacity rate (%) | 94 | 96 | 88 | 84 | 84 | 76 | 78 | 80 | 68 |
| | Increase rate of resistance (%) | 47 | 50 | 161 | 121 | 109 | 290 | 206 | 208 | 480 |

| | | C. Ex. e2 | C. Ex. e3 | C. Ex. e4 | C. Ex. e5 | C. Ex. e6 | C. Ex. e7 | C. Ex. e8 | C. Ex. e9 | C. Ex. e10 |
|---|---|---|---|---|---|---|---|---|---|---|
| Name of binder composition for power storage devices | | rc2 | rc3 | rc4 | rc5 | rc6 | rc7 | rc8 | rc9 | rc10 |
| Electrode characteristics (positive electrode) | Peel strength (N/m) | 16 | 18 | 26 | 10 | 7 | 2 | 8 | 36 | 22 |
| Power storage device | 5 C rate characteristic (%) | 68 | 61 | 51 | 46 | 46 | 45 | 48 | 64 | 44 |
| | Remaining capacity rate (%) | 52 | 35 | 77 | 81 | 80 | 20 | 79 | 50 | 72 |

TABLE 4-continued

| | Evaluation results of electrodes and power storage devices | | | | | | | | |
|---|---|---|---|---|---|---|---|---|---|
| Increase rate of resistance (%) | 450 | 621 | 201 | 250 | 180 | 1000 | 180 | 570 | 280 |

Ex.: Example,
C. Ex.: Comparative Example

As obvious from the above Examples, when the binder composition for power storage devices of the present invention is used for an electrode, it provides an electrode having excellent adhesion. It was confirmed that a power storage device (lithium ion secondary battery) having this electrode is excellent in high-speed discharge characteristics and resistance to thermal stress and overcharge.

In contrast to this, power storage devices (Comparative Examples e1 to e3) manufactured by using the binder compositions for power storage devices obtained in Comparative Examples c1 to c3 are inferior in resistance to thermal stress and overcharge. It is considered that this is due to unsatisfactory resistance to the electrolytic solution of the binder compositions. Power storage devices (Comparative Examples e4 to e6, e8 and e10) manufactured by using the binder compositions for power storage devices obtained in Comparative Examples c4 to c6, c8 and c10 are inferior in high-speed discharge characteristics. It is considered that this is due to the unsatisfactory affinity for the electrolytic solution of the binder compositions. An electrode formed from the binder composition for power storage devices in Comparative Example c7 is inferior in adhesion, and a power storage device having this electrode is inferior in high-speed discharge characteristics and resistance to thermals stress and overcharge (Comparative Example e7). It is considered that this is due to the great structural deterioration of the electrode caused by the unsatisfactory adhesion of the electrode. Further, power storage devices manufactured by using the binder compositions for power storage devices of Comparative Examples c8 to c10 are inferior in resistance to thermal stress and overcharge (Comparative Examples e8 to e10). It is considered that this is due to the unsatisfactory oxidation resistance of electrodes manufactured by using these binder compositions.

In the above Examples, power storage devices were manufactured by using the same binder composition for both the positive electrode and the negative electrode and evaluated. This is a very severe resistance test on the material of the present invention which should have both resistance to oxidation in the positive electrode and resistance to reduction in the negative electrode. A binder material which has such almighty resistance has been not known yet. In Examples e15 to e17 in which a binder composition comprising a polymer having no recurring unit derived from a monomer having a fluorine atom (compound (a4)) is used for a positive electrode, it is truly remarkable that the obtained binder composition shows such good evaluation results that it can be used in terms of 5C rate characteristic, remaining capacity rate and the increase rate of resistance.

<Use of Binder Composition for Protective Film>

Example P1

1. Preparation of Protective Film Slurry 100 parts by mass of titanium oxide (KR380 of Titan Kogyo Ltd., rutile type, number average particle diameter of 0.38 μm) of titanium oxide as a filler, 5 parts by mass in terms of solid content of the binder composition (C1) for power storage devices obtained in the above Example C1 and 1 part by mass of CMC1120 of Daicel Corporation as a thickener were injected into 500 parts by mass of water and mixed and dispersed by using the T.K. FILMIX® 56-50 thin-film spin system high-speed mixer of PRIMIX Corporation to prepare protective film slurry.

2. Manufacture and Evaluation of Power Storage Device (1) Manufacture of Positive Electrode Commercially available iron lithium phosphate (LiFePO$_4$) was pounded in an agate mortar and classified by using a sieve to prepare positive electrode active material particles having a particle diameter (D50 value) of 0.5 μm.

4 parts by mass of vinylidene polyfluoride (PVDF), 100 parts by mass of the above positive electrode active material particles, 5 parts by mass of acetylene black and 68 parts by mass of N-methyl pyrrolidone (NMP) were injected into a double-screw planetary mixer (TK HIVIS MIX 2P-03 of PRIMIX Corporation) and stirred at 60 rpm for 1 hour. Thereafter, 32 parts of NMP was further additionally injected and stirred for 1 hour to obtain paste. A stirring defoaming device (Awatori Nentaro of THINKY Corporation) was used to stir and mix the obtained paste at 200 rpm for 2 minutes, at 1,800 rpm for 5 minutes and further at 1,800 rpm for 1.5 minutes under vacuum (about 5.0×103 Pa) to prepare positive electrode slurry.

The above positive electrode slurry was uniformly applied to the surface of a collector composed of aluminum foil with a doctor blade to a film thickness after drying of 100 μm and dried at 120° C. for 20 minutes. Thereafter, the dried film (active material layer) was pressed with a roll press to ensure that the density of the film (active material layer) became 2.0 g/cm$^3$ so as to manufacture a positive electrode.

(2) Manufacture of Negative Electrode 4 parts by mass of vinylidene polyfluoride (PVDF), 100 parts by mass of graphite as a negative electrode active material and 80 parts by mass of N-methyl pyrrolidone (NMP) were injected into the TK HIVIS MIX 2P-03 double-screw planetary mixer and stirred at 60 rpm for 1 hour. 20 parts of NMP was added to the resulting mixture after stirring, and the Awatori Nentaro stirring defoaming device was used to mix and stir the mixture at 200 rpm for 2 minutes, at 1,800 rpm for 5 minutes and further at 1,800 rpm for 1.5 minutes under vacuum so as to prepare negative electrode slurry.

The above negative electrode slurry was uniformly applied to the surface of a collector composed of aluminum foil with a doctor blade to a film thickness after drying of 150 μm and dried at 120° C. for 20 minutes. Thereafter, the dried film was pressed with a roll press to ensure that the density of the film became 1.5 g/cm$^3$ to manufacture a negative electrode.

(3) Formation of Protective Film (Manufacture of Separator Having Protective Films)

The protective film slurry obtained above was applied to both sides of a separator composed of a polypropylene porous film (Celgard #2400 of Celgard LLC.) by dip coating and dried at 80° C. for 10 minutes to form a protective film on both sides of the above separator. The thickness of this protective film was 2 μm (the total thickness of the protective films on both sides was 4 μm).

(4) Assembly of Lithium Ion Secondary Battery

A product having a diameter of 16.16 mm punched out from the negative electrode manufactured in "(2) manufacture of negative electrode" was mounted on a bipolar coin cell (HS Flat Cell of Hohsen Corporation) in a glove box substituted by Ar to ensure that the dew point became −80° C. or lower. Then, a product having a diameter of 24 mm punched out from the separator having protective films produced in "(2) formation of protective film (manufacture of separator having protective films)" was mounted on the negative electrode, 500 μL of an electrolytic solution was injected such that air was not contained therein, a product having a diameter of 15.95 mm punched out from the positive electrode manufactured in "(2) manufacture of positive electrode" was mounted on the separator, and the exterior body of the above bipolar coin cell was sealed with a screw to assemble a lithium ion secondary battery cell (power storage device). The electrolytic solution used herein was a solution prepared by dissolving $LiPF_6$ in an ethylene carbonate/ethyl methyl carbonate (weight ratio of 1/1) solvent to a concentration of 1 mol/L.

(5) Measurement of Remaining Capacity Rate and Increase Rate of Resistance

The battery cell manufactured above was put into a 25° C. thermostat tank, and charging was started at a constant current (0.2C), continued at a constant voltage (4.1V) when the voltage became 4.1 V and completed (cut off) when the current value became 0.01 C. Then, discharging was started at a constant current (0.2 C) and completed (cut off) when the voltage became 2.5 V to carry out aging charge/discharge.

Subsequently, the charging of the cell after the above aging charge/discharge was started at a constant current (0.2 C) in the 25° C. thermostat tank, continued at a constant voltage (4.1 V) when the voltage became 4.1 V and completed (cut off) when the current value became 0.01 C. Then, discharging was started at a constant current (0.2 C) and completed (cut off) when the voltage became 2.5 V to measure C1 which is the value of discharge capacity (initial) at 0.2 C.

Then, the charging of the cell after the measurement of discharge capacity (initial) was started at a constant current (0.2 C) in the 25° C. thermostat tank, continued at a constant voltage (4.1 V) when the voltage became 4.1 V and completed (cut off) when the current value became 0.01 C.

The Electrochemical Impedance Spectroscopy (EIS) of the charged cell was carried out to measure the initial resistance value EISa.

Then, the cell after the measurement of the initial resistance value EISa was put into a 60° C. thermostat tank, and charging was started at a constant current (0.2 C) and continued at a constant voltage (4.4 V) for 240 hours when the voltage became 4.4 V (overcharge acceleration test).

After this charged cell was put into a 25° C. thermostat tank to reduce the cell temperature to 25° C., discharging was started at a constant current (0.2 C) and completed (cut off) when the voltage became 2.5 V to measure C2 which is a discharge capacity value (after the test) at 0.2 C.

Further, while the cell after the above measurement of C2 was kept in the 25° C. thermostat tank, charging was started at a constant current (0.2C), continued at a constant voltage (4.1 V) when the voltage became 4.1 V and completed (cut off) when the current value became 0.01 C. Then, discharging was started at a constant current (0.2 C) and completed (cut off) when the voltage became 2.5 V.

The EIS measurement of this cell was conducted to measure EISb which is a resistance value after the application of thermal stress and overcharge stress.

The remaining capacity rate obtained by inserting the above measurement values into the above numerical expression (4) was 94%, and the increase rate of resistance obtained by inserting the above measurement values into the above numerical expression (5) was 32%. The above numerical expressions (4) and (5) are given below just in case.

Remaining capacity rate (%)=(C2/C1)×100   (4)

Increase rate of resistance (%)((EISb−EISa)/EISa)× 100   (5)

Examples P2 to P9 and Comparative Examples p1 to p5

Protective film slurry was prepared in the same manner as in Example P1 except that the type and amount of the filler used in "1. Preparation of protective film slurry" and the type and amount of the binder composition for power storage devices were as shown in Table 5, and a lithium ion secondary battery cell (power storage device) was manufactured by using the protective film slurry and evaluated. The evaluation results are shown in Table 5.

Example P10

1. Preparation of Protective Film Slurry 100 parts by mass of magnesium oxide (PUREMAG® FNM-G of Tateho Chemical Industries Co., Ltd., number average particle diameter of 0.50 μm) as a filler, 5 parts by mass in terms of solid content of the binder composition (C10) for power storage batteries obtained in the above Example C10 and 1 part by mass of CMC1120 of Daicel Corporation as a thickener were injected into 500 parts by mass of water and mixed and dispersed by using the T.K. FILMIX® 56-50 thin-film spin system high-speed mixer of PRIMIX Corporation to prepare protective film slurry.

2. Manufacture and Evaluation of Power Storage Device (1) Manufacture of Positive Electrode Having Protective Film A positive electrode was manufactured in the same manner as in "(1) manufacture of positive electrode" in the above Example P1.

The protective film slurry prepared above was applied to the surface of the positive electrode active material layer obtained above by a die coating method and dried at 120° C. for 5 minutes to form a protective film having a thickness of 3 μm on the surface of the positive electrode active material layer so as to obtain a positive electrode having a protective film.

(2) Assembly of Lithium Ion Secondary Battery Cell

A lithium ion secondary battery cell (power storage device) was manufactured and evaluated in the same manner as in the above Example P1 except that the positive electrode having a protective film manufactured above was used as the positive electrode and a product having a diameter of 24 mm punched out from the Celgard #2400 (without a protective film) of Celgard LLC. was used as a separator. When the positive electrode having a protective film was set in the coin cell, the protective film faced downward (separator side).

The evaluation results are shown in Table 6.

Examples P11 to P14 and Comparative Examples p6 to p8

Protective film slurry was prepared in the same manner as in Example P1 except that the type and amount of the filler used in "1. Preparation of protective film slurry" and the type and amount of the binder composition for power storage devices in the above Example P10 were as shown in Table 6, and a lithium ion secondary battery cell (power storage device) was manufactured by using the protective film slurry and evaluated.

The evaluation results are shown in Table 6.

Comparative Example p9

1. Preparation of Protective Film Slurry
(1) Preparation of Polyimide Solution 1.0 mole of 2,2-bis(3,4-dicarboxyphenyl)hexafluropropane dianhydride and 0.95 mole of o-tolidine diisocyanate were dissolved in N-methyl-2-pyrrolidone (NMP) in a flask equipped with a cooling tube and a nitrogen gas introduction port to prepare a solution having a monomer concentration of 20 mass %. 0.01 mole of diazabicycloundecene as a catalyst was added to and mixed with the solution to carry out a reaction at 120° C. for 4 hours so as to obtain a solution containing polyimide (imidization rate of 80%).

(2) Preparation of Protective Film Slurry 100 parts by mass of aluminum oxide (AKP-3000 of Sumitomo Chemical Co., Ltd., number average particle diameter of 0.74 μm) as a filler, 5 parts by mass in terms of solid content of the polyimide solution obtained above and 1 part by mass of the CMC1120 of Daicel Corporation as a thickener were injected into 500 parts by mass of NMP and mixed and dispersed by using the T.K. FILMIX® 56-50 thin-film spin system high-speed mixer of PRIMIX Corporation to prepare protective film slurry.

2. Manufacture and Evaluation of Power Storage Device

A lithium ion secondary battery cell (power storage device) was manufactured and evaluated in the same manner as in Example P10 except that the protective film slurry obtained above was used.

The evaluation results are shown in Table 6.

Comparative Example p10

1. Preparation of Protective Film Slurry
(1) Preparation of Polyamide-Imide Solution 0.7 mole of trimellitic anhydride, 0.3 mole of 3,3',4,4'-benzophenone tetracarboxylic anhydride, 1 mole of naphthalene diisocyanate and 0.01 mole of diazabicycloundecene were dissolved in N-methyl-2-pyrrolidone (NMP) in a flask equipped with a cooling tube, a nitrogen gas introduction tube and a stirrer to prepare a solution having a monomer concentration of 15 mass %, and then a reaction was carried out at 80° C. for 3 hours so as to prepare a polyamide-imide solution.

(2) Preparation of Protective Film Slurry

Protective film slurry was prepared in the same manner as in Comparative Example p9 except that the polyamide-imide solution obtained above was used in place of the polyimide solution in "(2) preparation of protective film slurry" in the above Comparative Example p9.

2. Manufacture and Evaluation of Power Storage Device

A lithium ion secondary battery cell (power storage device) was manufactured and evaluated in the same manner as in Example P10 except that the protective film slurry obtained above was used.

The evaluation results are shown in Table 6.

Example P15

1. Preparation of Protective Film Slurry 100 parts by mass of aluminum oxide (AKP-3000 of Sumitomo Chemical Co., Ltd., number average particle diameter of 0.74 μm) as a filler, 2 parts by mass in terms of solid content of the binder composition (C15) for power storage devices obtained in the above Example C15 and 1 part by mass of the CMC1120 of Daicel Corporation as a thickener were injected into 500 parts by mass of water and mixed and dispersed by using the T.K. FILMIX® 56-50 thin-film spin system high-speed mixer of PRIMIX Corporation to prepare protective film slurry.

2. Manufacture and Evaluation of Power Storage Device
(1) Manufacture of Negative Electrode Having Protective Film A positive electrode was manufactured in the same manner as in "(2) manufacture of negative electrode" in the above Example P1.

The protective film slurry prepared above was applied to the surface of the negative electrode active material layer obtained above by a die coating method and dried at 120° C. for 5 minutes to form a protective film having a thickness of 3 μm on the surface of the negative electrode active material layer so as to obtain a negative electrode having a protective film.

(2) Assembly of Lithium Ion Secondary Battery Cell

A lithium ion secondary battery cell (power storage device) was manufactured and evaluated in the same manner as in the above Example P1 except that the negative electrode having a protective film formed above was used as the negative electrode and a product having a diameter of 24 mm punched out from the Celgard #2400 (without a protective film) of Celgard LLC. was used as a separator. When the negative electrode having a protective film was set in the coin cell, the protective film faced upward (separator side).

The evaluation results are shown in Table 6.

Examples P16 and P17 and Comparative Examples p11 and p12

Protective film slurry was prepared in the same manner as in Example P15 except that the type and amount of the filler used in "1. Preparation of protective film slurry" and the type and amount of the binder composition for power storage devices were as shown in Table 6, and a lithium ion secondary battery cell (power storage device) was manufactured and evaluated by using this protective film slurry.

The evaluation results are shown in Table 6.

TABLE 5

Evaluation results of power storage devices

| | | | Ex. P1 | Ex. P2 | Ex. P3 | Ex. P4 | Ex. P5 |
|---|---|---|---|---|---|---|---|
| Binder composition for power storage devices | | | C1 | C2 | C3 | C4 | C5 |
| Protective film slurry | Inorganic particles | Type | TiO(1) | TiO(1) | TiO(1) | TiO(1) | TiO(1) |
| | | Particle diameter (μm) | 0.38 | 0.38 | 0.38 | 0.38 | 0.74 |
| | | Amount (parts by mass) | 100 | 100 | 100 | 100 | 100 |
| | Amount of binder (parts by mass) | | 5 | 5 | 5 | 5 | 2 |
| Power storage device | Protective film forming position | | both sides of separator | both sides of separator | both sides of separator | both sides of separator | both sides of separator |
| | Remaining capacity rate(%) | | 94 | 91 | 90 | 90 | 93 |
| | Increase rate of resistance(%) | | 32 | 83 | 37 | 48 | 45 |

| | | | Ex. P6 | Ex. P7 | Ex. P8 | Ex. P9 |
|---|---|---|---|---|---|---|
| Binder composition for power storage devices | | | C6 | C7 | C8 | C9 |
| Protective film slurry | Inorganic particles | Type | TiO(2) | SiO(1) | TiO(3) | ZrO |
| | | Particle diameter (μm) | 0.12 | 0.98 | 0.08 | 0.67 |
| | | Amount (parts by mass) | 100 | 100 | 100 | 100 |
| | Amount of binder (parts by mass) | | 10 | 3 | 2 | 5 |
| Power storage device | Protective film forming position | | both sides of separator | both sides of separator | both sides of separator | both sides of separator |
| | Remaining capacity rate(%) | | 94 | 93 | 92 | 92 |
| | Increase rate of resistance(%) | | 110 | 49 | 27 | 57 |

| | | | C. Ex. p1 | C. Ex. p2 | C. Ex. p3 | C. Ex. p4 | C. Ex. p5 |
|---|---|---|---|---|---|---|---|
| Binder composition for power storage devices | | | rc1 | rc2 | rc3 | rc4 | rc5 |
| Protective film slurry | Inorganic particles | Type | TiO(1) | TiO(1) | TiO(1) | TiO(1) | TiO(1) |
| | | Particle diameter (μm) | 0.38 | 0.38 | 0.38 | 0.38 | 0.38 |
| | | Amount (parts by mass) | 100 | 100 | 100 | 100 | 100 |
| | Amount of binder (parts by mass) | | 5 | 5 | 5 | 5 | 5 |
| Power storage device | Protective film forming position | | both sides of separator | both sides of separator | both sides of separator | both sides of separator | both sides of separator |
| | Remaining capacity rate(%) | | 70 | 84 | 77 | 64 | 58 |
| | Increase rate of resistance(%) | | 290 | 220 | 450 | 30 | 360 |

Ex.: Example
C. Ex.: Comparative Example

TABLE 6

Evaluation results of power storage devices

| | | | Ex. P10 | Ex. P11 | Ex. P12 | Ex. P13 | Ex. P14 |
|---|---|---|---|---|---|---|---|
| Binder composition for power storage devices | | | C10 | C11 | C12 | C13 | C14 |
| Protective film slurry | Inorganic particles | Type | MgO | SiO(2) | AlO(2) | AlO(1) | AlO(2) |
| | | Particle diameter (μm) | 0.50 | 0.54 | 0.22 | 0.74 | 0.22 |

TABLE 6-continued

Evaluation results of power storage devices

| | | | | | | | |
|---|---|---|---|---|---|---|---|
| | | Amount (parts by mass) | 100 | 100 | 100 | 100 | 100 |
| | | Amount of binder (parts by mass) | 5 | 5 | 4 | 0.5 | 10 |
| Power storage device | | Protective film forming position | surface of positive electrode | surface of positive electrode | surface of positive electrode | surface of positive electrode | surface of positive electrode |
| | | Remaining capacity rate(%) | 88 | 95 | 90 | 87 | 88 |
| | | Increase rate of resistance(%) | 50 | 49 | 32 | 44 | 100 |

| | | | C. Ex. p6 | C. Ex. p7 | C. Ex. p8 | C. Ex. p9 | C. Ex. p10 |
|---|---|---|---|---|---|---|---|
| Binder composition for power storage devices | | | rc6 | rc7 | rc8 | polyimide | polyamidimide |
| Protective film slurry | Inorganic particles | Type | TiO(1) | TiO(1) | TiO(1) | AlO(1) | AlO(1) |
| | | Particle diameter (μm) | 0.38 | 0.38 | 0.38 | 0.74 | 0.74 |
| | | Amount (parts by mass) | 100 | 100 | 100 | 100 | 100 |
| | | Amount of binder (parts by mass) | 5 | 5 | 5 | 5 | 5 |
| Power storage device | | Protective film forming position | surface of positive electrode | surface of positive electrode | surface of positive electrode | surface of positive electrode | surface of positive electrode |
| | | Remaining capacity rate(%) | 68 | 66 | 70 | 90 | 85 |
| | | Increase rate of resistance(%) | 22 | 430 | 280 | 300 | 280 |

| | | | Ex. P15 | Ex. P16 | Ex. P17 | C. Ex. p11 | C. Ex. p12 |
|---|---|---|---|---|---|---|---|
| Binder composition for power storage devices | | | C15 | C16 | C17 | rc9 | rc10 |
| Protective film slurry | Inorganic particles | Type | AlO(1) | TiO(2) | SiO(1) | AlO(1) | AlO(1) |
| | | Particle diameter | 0.74 | 0.12 | 0.98 | 0.74 | 0.74 |
| | | Amount (parts by mass) | 100 | 100 | 100 | 100 | 100 |
| | | Amount of binder | 2 | 10 | 3 | 5 | 5 |
| Power storage device | | Protective film forming position | surface of negative electrode | surface of negative electrode | surface of negative electrode | surface of negative electrode | surface of negative electrode |
| | | Remaining capacity rate(%) | 82 | 83 | 83 | 65 | 65 |
| | | Increase rate of resistance(%) | 150 | 90 | 180 | 240 | 120 |

Ex.: Example
C. Ex.: Comparative Example

The abbreviations in the columns for the type of the inorganic particles in Table 5 and Table 6 mean the following.

TiO(1): KR380 of Titan Kogyo Ltd., rutile type, number average particle diameter of 0.38 μm TiO(2): particles having a number average particle diameter of 0.12 μm obtained by pounding KR380 of Titan Kogyo Ltd. in an agate mortar and classifying with a sieve TiO(3): particles having a number average particle diameter of 0.08 μm obtained by pounding KR380 of Titan Kogyo Ltd. in an agate mortar and classifying with a sieve AlO(1): AKP-3000 of Sumitomo Chemical Co., Ltd., number average particle diameter of 0.74 μm AlO(2): AKP-50 of Sumitomo Chemical Co., Ltd., number average particle diameter of 0.22 μm SiO(1): SEAHOSTAR® KE-S100 of Nippon Shokubai Co., Ltd., number average particle diameter of 0.98 μm SIO(2): SEAHOSTAR® KE-S50, number average particle diameter of 0.54 μm ZrO: UEP zirconium oxide of Daiichi Kigenso Kagaku Kogyo Co., Ltd., number average particle diameter of 0.67 μm MgO: PUREMAG® FNM-G of Tateho Chemical Industries Co., Ltd., number average particle diameter of 0.50 μm It is understood from Table 5 and Table 6 that when the binder composition for power storage devices of the present invention is used to form a protective film, a power storage device (lithium ion secondary battery) having excellent charge/discharge characteristics is obtained.

EFFECT OF THE INVENTION

Since an electrode formed from electrode slurry prepared by using the binder composition for power storage devices of the present invention is excellent in resistance to oxidation and reduction and also adhesion, it has such durability that it can retain excellent initial charge/discharge characteristics for a long time. A power storage device having this electrode (for example, a lithium ion secondary battery) is excellent in charge/discharge characteristics, especially high-speed discharge characteristics.

A protective film formed from protective film slurry prepared by using the binder composition for power storage devices of the present invention can prevent a short circuit caused by dendrite effectively and has sufficiently high electrolytic solution permeability and retainability. Therefore, a power storage device having the protective film eliminates the risk of a short circuit without impairing charge/discharge characteristics.

A power storage device manufactured by using the binder composition for power storage devices of the present invention can be advantageously used in drive power sources for electric cars, hybrid cars and electric tools; batteries for personal computers and mobile phones; and storage batteries attached to power generation systems such as solar power generation systems and wind power generation systems.

The invention claimed is:

1. A binder composition for power storage devices, the binder composition comprising:
   a polymer comprising:
   3 to 40 mass % of a first recurring unit derived from (a1) an unsaturated carboxylic acid ester comprising an alicyclic hydrocarbon group;
   1 to 40 mass % of a second recurring unit derived from (a2) an α, β-unsaturated nitrile compound;
   1 to 12 mass % of a recurring unit derived from (a3) an unsaturated carboxylic acid;
   not more than 50 mass % of a recurring unit derived from (a4) a monomer having a fluorine atom;
   30 to 90 mass % of a recurring unit derived from (a5) an unsaturated carboxylic acid ester excluding the unsaturated carboxylic acid ester having an alicyclic hydrocarbon group and excluding the monomer having a fluorine atom; and
   not more than 65 mass % of a recurring unit derived from (a6) at least one selected from the group consisting of a conjugated diene compound and an aromatic vinyl compound,
   mass percentages above based on 100 mass % of a total of all recurring units.

2. The binder composition according to claim 1, wherein a mass ratio of the first recurring unit to the second recurring unit in the polymer is from 0.3 to 30.

3. The binder composition according to claim 1, wherein the recurring unit (a1) derived from the unsaturated carboxylic acid ester comprising an alicyclic hydrocarbon group is a recurring unit derived from at least one selected from the group consisting of a monocyclic cycloalkyl ester, a bicyclic cycloalkyl ester, a cyclic hydrocarbon ester comprising 3 or more rings, and a spirocyclic cycloalkyl ester of an unsaturated carboxylic acid.

4. The binder composition according to claim 1, wherein the polymer comprises 3 to 10 mass % of the recurring unit derived from (a3) the saturated carboxylic acid.

5. The binder composition according to claim 1, wherein the polymer comprises 1 to 50 mass % of the recurring unit derived from (a4) the monomer comprising a fluorine atom.

6. The binder composition according to claim 1, wherein the polymer comprises 30 to 65 mass % of the recurring unit derived from (a6) the at least one selected from the group consisting of a conjugated diene compound and an aromatic vinyl compound, and no recurring unit (a4) derived from the monomer having the fluorine atom.

7. An electrode slurry for power storage devices, the electrode slurry comprising:
   the binder composition according to claim 1; and
   an electrode active material.

8. An electrode for power storage devices, the electrode comprising:
   a collector; and
   a layer formed by coating the electrode slurry according to claim 7 on a surface of the collector and drying the slurry.

9. A protective film slurry for power storage devices, the protective film slurry comprising:
   the binder composition according to claim 1; and
   a filler.

10. A protective film for power storage devices, formed from the protective film slurry according to claim 9.

11. A separator, comprising the protective film according to claim 10.

12. A power storage device, comprising:
    a positive electrode;
    a negative electrode; and
    the protective film according to claim 10 sandwiched between the positive electrode and the negative electrode.

* * * * *